(12) United States Patent
Terada

(10) Patent No.: US 7,308,155 B2
(45) Date of Patent: Dec. 11, 2007

(54) IMAGE PROCESSING APPARATUS, IMAGE PROCESSING METHOD, IMAGE PROCESSING PROGRAM, AND STORAGE MEDIUM

(75) Inventor: Yoshihiro Terada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 652 days.

(21) Appl. No.: 10/272,946

(22) Filed: Oct. 18, 2002

(65) Prior Publication Data

US 2003/0098983 A1    May 29, 2003

(30) Foreign Application Priority Data

Nov. 26, 2001  (JP)  ............................ P2001-359948

(51) Int. Cl.
*G06K 9/36* (2006.01)
(52) U.S. Cl. ...................... 382/284; 382/282; 382/294; 382/298; 358/540; 358/450
(58) Field of Classification Search ................ 382/284, 382/293, 294, 235, 298, 299, 233, 243, 194, 382/282; 358/540, 450, 1.2, 451, 452
See application file for complete search history.

(56) References Cited

U.S. PATENT DOCUMENTS

| | | | | |
|---|---|---|---|---|
| 5,262,867 A | * | 11/1993 | Kojima | .......................... 348/39 |
| 5,444,552 A | * | 8/1995 | Smith, III | ..................... 358/465 |
| 5,638,464 A | * | 6/1997 | Kawamura | .................... 382/232 |
| 5,644,411 A | * | 7/1997 | Tamagaki et al. | ............ 358/529 |
| 5,673,209 A | * | 9/1997 | Heiney et al. | ............... 708/203 |
| 5,721,624 A | * | 2/1998 | Kumashiro et al. | .......... 358/450 |
| 5,734,915 A | * | 3/1998 | Roewer | ....................... 715/512 |
| 5,880,778 A | * | 3/1999 | Akagi | ...................... 348/218.1 |
| 5,995,145 A | * | 11/1999 | Viliesid | ...................... 348/362 |
| 6,023,556 A | * | 2/2000 | Ledgard et al. | ............... 358/1.2 |
| 6,049,390 A | * | 4/2000 | Notredame et al. | ......... 358/1.15 |
| 6,201,571 B1 | * | 3/2001 | Ota | ............................. 348/239 |
| 6,219,454 B1 | * | 4/2001 | Kawano et al. | ............. 382/232 |
| 6,233,066 B1 | * | 5/2001 | Kojima et al. | ............... 358/488 |
| 6,424,752 B1 | * | 7/2002 | Katayama et al. | ........... 382/284 |

(Continued)

FOREIGN PATENT DOCUMENTS

JP        05-344328      12/1993

(Continued)

*Primary Examiner*—Yosef Kassa
(74) *Attorney, Agent, or Firm*—Morgan, Lewis & Bockius LLP

(57) ABSTRACT

In case of a "N-up" function, a correcting unit executes a correcting process operation with respect to an image read by an image input unit, a editing unit executes a magnification changing process operation, and thereafter, "N" sheets of images are placed side by side to form a single synthesized image at a time when the processed image is stored into a storage unit 15. When transmitting the synthesized image, an attribute of the image set from a U/I is added to the synthesized image and the control unit transmits the resulting image to an external apparatus. As a result, a reception side can execute an optimum processing operation with respect to the synthesized image with reference to the attribute added to the image. As a consequence, even in a "network copy", the "N-up" function can be realized in a high image quality similar to that of a "direct copy".

33 Claims, 24 Drawing Sheets

U.S. PATENT DOCUMENTS

| | | | |
|---|---|---|---|
| 6,484,149 B1 * | 11/2002 | Jammes et al. | 705/26 |
| 6,522,789 B2 * | 2/2003 | Takahashi et al. | 382/284 |
| 6,549,681 B1 * | 4/2003 | Takiguchi et al. | 382/294 |
| 6,628,419 B1 * | 9/2003 | So et al. | 358/1.16 |
| 6,744,471 B1 * | 6/2004 | Kakinuma et al. | 348/371 |
| 6,968,115 B2 * | 11/2005 | Matsumoto | 386/55 |
| 7,013,289 B2 * | 3/2006 | Horn et al. | 705/26 |
| 7,027,054 B1 * | 4/2006 | Cheiky et al. | 345/473 |
| 2002/0051230 A1 | 5/2002 | Ohta | |

FOREIGN PATENT DOCUMENTS

| | | |
|---|---|---|
| JP | 09-018683 | 1/1997 |
| JP | 11-275299 | 10/1999 |
| JP | 2000-101823 | 4/2000 |
| JP | 2001-127989 | 5/2001 |
| JP | 2001-136322 | 5/2001 |
| JP | 2001-211316 | 8/2001 |

* cited by examiner

FIG. 5

| $K_{1,1}$ | $K_{1,2}$ | $K_{1,3}$ | $K_{1,4}$ | $K_{1,5}$ | $K_{1,6}$ | $K_{1,7}$ |
|---|---|---|---|---|---|---|
| $K_{2,1}$ | $K_{2,2}$ | $K_{2,3}$ | $K_{2,4}$ | $K_{2,5}$ | $K_{2,6}$ | $K_{2,7}$ |
| $K_{3,1}$ | $K_{3,2}$ | $K_{3,3}$ | $K_{3,4}$ | $K_{3,5}$ | $K_{3,6}$ | $K_{3,7}$ |
| $K_{4,1}$ | $K_{4,2}$ | $K_{4,3}$ | $K_{4,4}$ | $K_{4,5}$ | $K_{4,6}$ | $K_{4,7}$ |
| $K_{5,1}$ | $K_{5,2}$ | $K_{5,3}$ | $K_{5,4}$ | $K_{5,5}$ | $K_{5,6}$ | $K_{5,7}$ |
| $K_{6,1}$ | $K_{6,2}$ | $K_{6,3}$ | $K_{6,4}$ | $K_{6,5}$ | $K_{6,6}$ | $K_{6,7}$ |
| $K_{7,1}$ | $K_{7,2}$ | $K_{7,3}$ | $K_{7,4}$ | $K_{7,5}$ | $K_{7,6}$ | $K_{7,7}$ |

| SORT \ MODE | FULL COLOR | | BLACK/WHITE | |
|---|---|---|---|---|
| | RESOLUTION | COMPRESSION SYSTEM | RESOLUTION | COMPRESSION SYSTEM |
| CHARACTER | 400 | JPEG | 400 | MMR |
| PHOTOGRAPH | 200 | JPEG | 200 | MH |
| CHARACTER/ PHOTOGRAPH | 400 | JPEG | 400 | MMR |
| MAP | 400 | JPEG | 400 | JPEG |

(1) (2) (3) (4)

FIG. 16
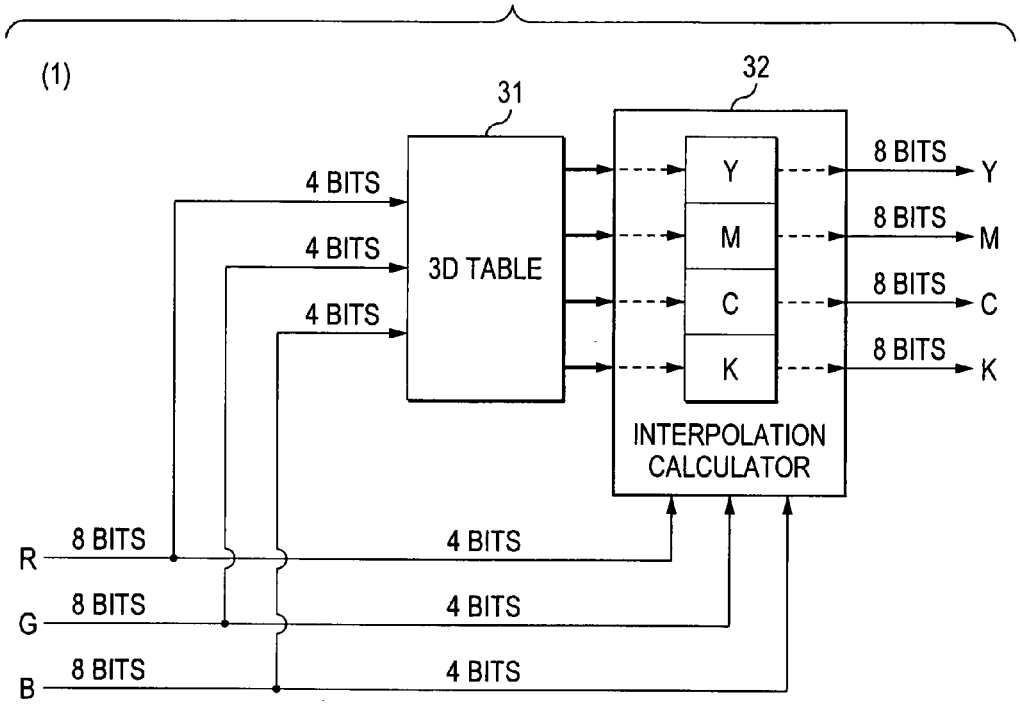
(1)
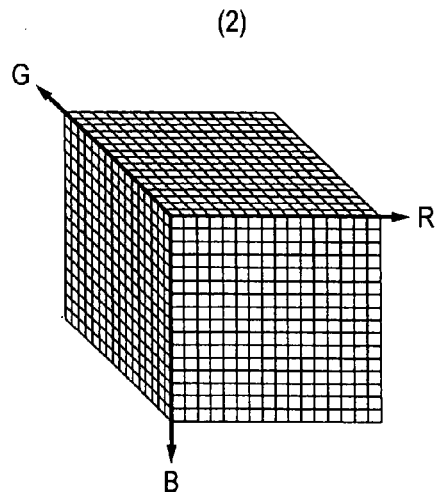
(2)
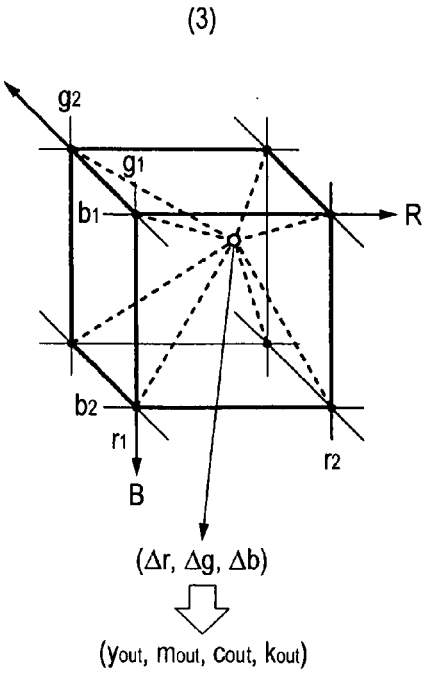
(3)
$(\Delta r, \Delta g, \Delta b)$
⇩
$(y_{out}, m_{out}, c_{out}, k_{out})$ (1)

(2) FOREGROUND IMAGE
(3) MASK
(4) BACKGROUND IMAGE (5)

IMAGE PROCESSING APPARATUS, IMAGE PROCESSING METHOD, IMAGE PROCESSING PROGRAM, AND STORAGE MEDIUM

The present disclosure relates to the subject matter contained in Japanese Patent Application No. 2001-359948 filed on Nov. 26, 2001, which is incorporated herein by reference in its entirety.

BACKGROUND OF THE INVENTION

1. Field of the Invention

The present invention is related to an image processing operation for placing a plurality of images side by side with each other to form a single synthesized image. More specifically, the present invention is directed to both an image processing apparatus and an image processing method, which are suitably applied to such a system that an apparatus into which an image is inputted is physically different from another apparatus which outputs a synthesized image. Also, the present invention is directed to an image processing program capable of causing a computer to execute such an image processing method, and also directed to a storage medium for storing thereinto this image processing program.

2. Description of the Related Art

Very recently, there are greatly conspicuous progress in functions and performance in digital color appliance fields such as scanners and printers. Since these input/output electronic appliances are combined with each other, copying operations of originals can be readily carried out, as compared with the conventional original copying operations. Also, since networks are popularized, images of originals may be duplicated by combining network scanners with network printers. These copying operations executed via these networks can provide not only similar functions to those of the conventional original copying operations, but also additional values such as transmissions of original information to remote places, which cannot be provided by conventional copying machines. It should be understood in this specification that a copy of an original realized by connecting a scanner via a digital signal transmission path such as a network to a printer will be referred to as a "network copy", whereas such a conventional original copy will be referred to as a "direct copy." To realize this conventional original copy, a scanner is directly connected to a printer, or is directly connected to a controller such as a computer.

As one of editing functions in the conventional "direct copy" operation, there is such a function that a plurality of original images are placed side by side with each other on a single sheet of paper and then are recorded. FIG. 27 is an explanatory diagram for explaining an example of such a function that a plurality of original images are placed side by side with each other on a single sheet of paper, and then are recorded. For instance, as indicated in FIG. 27(1), two sheets of original images may be placed side by side with each other as represented in FIG. 27(2), and then may be recorded. Such an editing process operation will be referred to as a "2-up" process operation in the below-mentioned description. Similarly, for instance, as indicated in FIG. 27(3), four sheets of original images may be placed side by side with each other as represented in FIG. 27(4) and then may be recorded. Such an editing process operation will be referred to as a "4-up" process operation in the below-mentioned description. Apparently, among others, for instance, there is an "8-up" process operation in which eight sheets of original images may be placed side by side with each other, and then may be recorded. That is, an arbitrarily selected number of original images may be placed side by side with each other, and then may be recorded. As previously explained, editing process operations for placing a plurality of original images side by side on a single sheet of paper so as to record the placed plural original images will be commonly referred to as an "N-up" process operation.

Such an "N-up" function may achieve effects that consumption of paper is saved, and a comprehensive surveying characteristic of information is improved. As a result, this "N-up" function may constitute one of very important editing functions in the case that documents are formed and/or distributed.

Conventionally, while color originals are duplicated, image processing operations are made different from each other in order to obtain higher image qualities, depending upon such a fact that originals correspond to color originals, or black/white originals, and sorts of originals. For example, in the case that photograph originals are duplicated, such an image processing operation capable of emphasizing gradation is carried out, whereas in the case that character originals are duplicated, such an image processing operation capable of emphasizing resolution in a top priority, and also capable of reproducing black characters in a single black color is carried out.

FIG. 28 is an explanatory diagram for explaining one structural example capable of realizing the "N-up" function when the direct copy operation is carried out. In this drawing, reference numeral 41 shows a scanner unit; reference numeral 42 represents a page memory; reference numeral 43 indicates an image processing unit; reference numeral 44 denotes a printer unit; and reference numeral 45 shows a control unit. FIG. 28 indicates the structural example capable of realizing the "2-up" function. The scanner unit 41 reads an image formed on an original. The image data read by the scanner unit 41 is stored in the page memory 42. The image processing unit 43 reads out the image data stored in the page memory 42, and then, performs various sorts of image processing operations so as to reproduce/duplicate images. The printer unit 44 records the images which have been processed by the image processing unit 43 to output the recorded images. The control unit 45 controls operations of these respective units.

Operations when the "2-up" function is performed will now be briefly explained. First, an image formed on an original is optically read to be converted into a digital color image signal by the scanner unit 41, and then, this digital color image signal is temporarily stored in the page memory 42. When the "2-up" function is designated, a synthesized image is produced on the page memory 42 by controlling image writing coordinate values to this page memory 42. The image processing unit 43 reads out the image data from this page memory 42, and executes the image processing operation as to this read image data. At this time, the control unit 45 instructs the image processing unit 43 to switch the image process operations based upon the coordinate value of the synthesized image. As a result, such an image processing operation suitable for a difference in attributes of original images may be realized. For example, in the example shown in FIG. 28, in the case that both an image of a "character type" and an image of a "photograph type" are read by the scanner unit 41, and then these two images are placed side by side to be synthesized with each other, both a "character type" portion and a "photograph type" portion are present within a single synthesized image. The control unit 45 instructs the image processing unit 43 to execute such an image processing operation which is optimized to character images with respect to the "character type" portion, and also instructs the image processing unit 43 to execute such an image processing operation which is optimized to photograph images with respect to the "photograph type" portion. Then, the synthesized image data to which the image processing operations have been executed by the image processing unit 43 is transferred to the printer unit 44, so that a synthesized image is recorded on paper. When this synthesized image is recorded by the printer unit 44, this synthesized image may be recorded in accordance with the image forming methods selected for the respective type portions.

As previously explained, in the conventional direct copy, such an image processing operation similar to that of the normal copy may be realized even when the "N-up" function is executed in such a manner that the respective units such as the scanner unit 41, the image processing unit 43, and the printer unit 44 are controlled by the same control unit 45.

In contrast to this direct copy, in the case that the conventional network copy is produced, for example, when a network scanner is utilized, a scanner unit is controlled, whereas when a network printer is used, a printer unit is controlled. Also, as to an image processing unit, this image processing unit may be arranged in an integral manner together with a network scanner and a network printer. Alternatively, while image processing units are separately arranged with these network scanner and network printer respectively, these image processing units are independently controlled. As a result, for instance, at a time instant when images are synthesized with each other, such an information that an original image corresponds to a "character type" image, or a "photograph type" image will be lost, and therefore, when either an image processing operation or a recording operation is carried out, image processing operations cannot be switched with respect to these image/character regions. As a consequence, in the case that the "N-up" function is utilized in the conventional network copy, the image processing operations similar to those of the normal direct copy cannot be carried out, so that various problems may occur. That is, for example, reproducing process operations which are suitable for a character original and a photograph original cannot be correctly carried out. Even when black characters are contained in a character original, these black characters cannot be reproduced in a single black color.

SUMMARY OF THE INVENTION

The present invention has been made to solve the above-described problems, and therefore, has an object to provide both an image processing apparatus and an image processing method, capable of outputting images in high image qualities even in such a case that a so-called "N-up" function is utilized in a network copy, and also to provide both a program used to execute such an image processing operation and a storage medium for storing thereinto such a program.

In accordance with the present invention, in an image processing apparatus provided on the transmission side, a plurality of entered images are reduced respectively, a plurality of reduced images are placed side by side to be synthesized with each other so as to produce a single synthesized image, and attribute information corresponding to the synthesized image is produced, and also, both the synthesized image and the attribute information are transmitted to an image processing apparatus provided on the reception side. The image processing apparatus provided on the reception side receives information which contains a synthesized image in which plurality of images are placed side by side to form a single synthesized image, and attribute information corresponding to the synthesized image; extracts both the synthesized image and the attribute information from the received information; produces attribute information every such an area different from an area corresponding to the attribute information based upon the extracted attribute information; and corrects the synthesized image based upon the produced attribute information produced. As previously explained, since the synthesized image is transmitted in combination with the attribute information, the image processing apparatus provided on the reception side can execute the correcting process operation in response to the respective areas, and thus, can obtain the "N-up" image output having the high image quality. It should be noted that the attribute information transmitted in combination with the synthesized image may be transmitted every such an area that the reduced image before being synthesized is used as a minimum unit, or may be transmitted as single attribute information as to the synthesized image, otherwise may be transmitted in the unit of the pixel of the synthesized image.

Also, according to the present invention, an image processing apparatus provided on the transmission side reduces a plurality of entered images respectively; places the plurality of reduced images side by side so as to synthesize the plural images every an attribute of the image, and produces a plurality of synthesized images; and transmits the plurality of synthesized images. Since an image processing apparatus provided on the reception side can execute the process operation in response to the attribute every synthesized image, the image which has been synthesized by the "N-up" function can be obtained in the high image quality. It should be noted that when a plurality of synthesized images are transmitted, these plural synthesized images have been compressed based upon the compression systems corresponding to the respective synthesized images, and thereafter, these compressed synthesized image is transmitted. As a result, while lowering of the image qualities in the respective synthesized images is suppressed, a total data amount of data to be transferred can be reduced.

Furthermore, an image processing apparatus provided on the transmission side converts a plurality of entered images, attribute information of the respective images, and such a synthesize-instructing information for placing these plural images side by side to synthesize these images as a single image into such an information having a predetermined format, and then transmits the converted information. An image processing apparatus provided on the reception side receives the information having the predetermined format, which contains the plural images, attribute information of the respective images, and such a synthesize-instructing information for placing these plural images side by side to synthesize these images as a single image. This image processing apparatus extracts a plurality of images and the attribute information of the respective images from the received information having the predetermined format; reduces the plural images in accordance with the synthesize-instructing information; places a plurality of reduced images to be synthesized with each other so as to produce a single synthesized image in accordance with the synthesize-instruction information; and then, outputs the single synthesized image. In this processing step, for example, the image processing apparatus may correct with respect to the respective images before being reduced, or the respective images after being reduced, otherwise the synthesized image based upon the attribute information. In this arrangement, since both the reducing process operation and the synthesizing process operation can be controlled by the image processing apparatus provided on the reception side, the process operations with high image qualities can be carried out in a similar manner to that of the "direct copy." When an image is transmitted from the image processing apparatus provided on the transmission side, since such an image having an original dimension is transmitted, there is such a risk that a total amount of data to be transmitted is increased. However, for example, each of these plural images is reduced based upon a compression ratio scheduled in the reducing process operation by the image processing apparatus provided on the reception side. As a result, a data amount during data communication can be reduced.

Furthermore, according to the present invention, an image processing apparatus provided on the transmission side reduces a plurality of entered images respectively; and converts the plurality of reduced images and also such an information that these plural images are placed side by side so as to be synthesized as a single image into information having a predetermined format; and then transmit the converted information. At this time, this image processing apparatus may also convert attribute information with respect to the respective images into information having a predetermined format, and then may transmit the converted information. An image processing apparatus provided on the reception side receives the information having the predetermined format, which contains the plural images, attribute information of the respective images, and such a synthesize-instructing information for placing these plural images side by side to synthesize these images as a single image into such an information having a predetermined format. This image processing apparatus places a plurality of images side by side to be synthesized with each other so as to produce a single synthesized image in accordance with the above-described synthesize-instructing information; and then outputs the synthesized image. In this process step, in such a case that the attribute information corresponding to the respective images is transmitted form the transmission side, the image processing apparatus provided on the reception side may correct the respective images before being synthesized with each other, or the synthesized image by employing this transmitted attribute information. Also, when such an attribute information is not transmitted, the image processing apparatus provided on the reception side may produce the attribute information, and may correct the respective images before being synthesized with each other, or the synthesized image based upon this produced attribute information. In this arrangement, while the reducing process operation has been carried out as to the images received by the image processing apparatus provided on the reception side, this image processing apparatus receives these reduced images as independent images. Accordingly, the optimum process operations may be carried out with respect to the respective images in the process operation when the image synthesizing operation is carried out, and after the image synthesizing operation has been executed. As a consequence, the "N-up" function can be realized in a high image quality similar to that obtained when the "direct copy" is produced.

BRIEF DESCRIPTION OF THE DRAWINGS

FIG. 5 is an explanatory diagram for explaining multiplication coefficients in one example of the precision correcting process operation.

FIG. 16 is an explanatory diagram for explaining an example of a color correcting process operation.

DETAILED DESCRIPTION OF THE PREFERRED EMBODIMENTS

Figure 1:
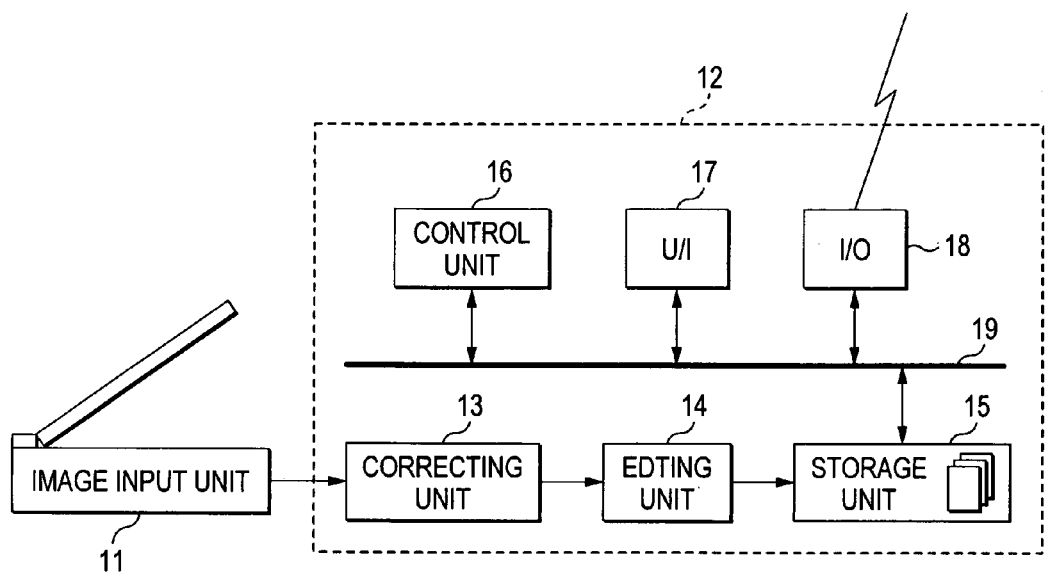
FIG. 1 is a block diagram for indicating the configuration of a transmission side according to a first embodiment of the present invention.

FIG. 1 is a schematic block diagram for indicating an arrangement of an image processing apparatus provided on the transmission side, according to a first embodiment of the invention. In this drawing, reference numeral 11 shows an image input unit, reference numeral 12 indicates an image processing unit, reference numeral 13 represents a correcting unit, and reference numeral 14 denotes an editing unit. Also, reference numeral 15 shows a storage unit, reference numeral 16 indicates a control unit, reference numeral 17 represents a U/I, reference numeral 18 shows an I/O and also, reference numeral 19 indicates a system bus. The image input unit 11 is constituted by, for example, a scanner and the like, and reads out a color image formed on an original.

The image processing unit 12 performs a necessary process operation with respect to a digital image signal read by the image input unit 11, and thereafter, transmits the processed image signal in a predetermined format. As indicated in FIG. 1, the image processing unit 12 is constituted by the correcting unit 13, the editing unit 14, the storage unit 15, the control unit 16, the U/I 17, the I/O 18, the system bus 19, and the like. The correcting unit 13 is to perform such a process operation that a color characteristic, a gradation characteristic, and a spatial characteristic of the image input unit 11 are corrected so as to improve an image quality. The editing unit 14 executes various sorts of image processing operations, for instance, an enlargement of an image, and a reduction of an image. The storage unit 15 corresponds to a storage section capable of storing thereinto an amount of at least one page data of images. The control unit 16 is constructed of a CPU, a ROM, a RAM, and the like. The control unit 16 executes a portion of the image processing operations, and also controls the image processing unit 12. The U/I 17 is a user interface which is used by a user who instructs operations executed in both the image input unit 11 and the image processing unit 12. The I/O 18 is disposed to connect to a network, via which a communication is carried out with respect to an external apparatus. The system bus 19 corresponds to a local bus used to connect the above-described processing units to each other.

Figure 2:
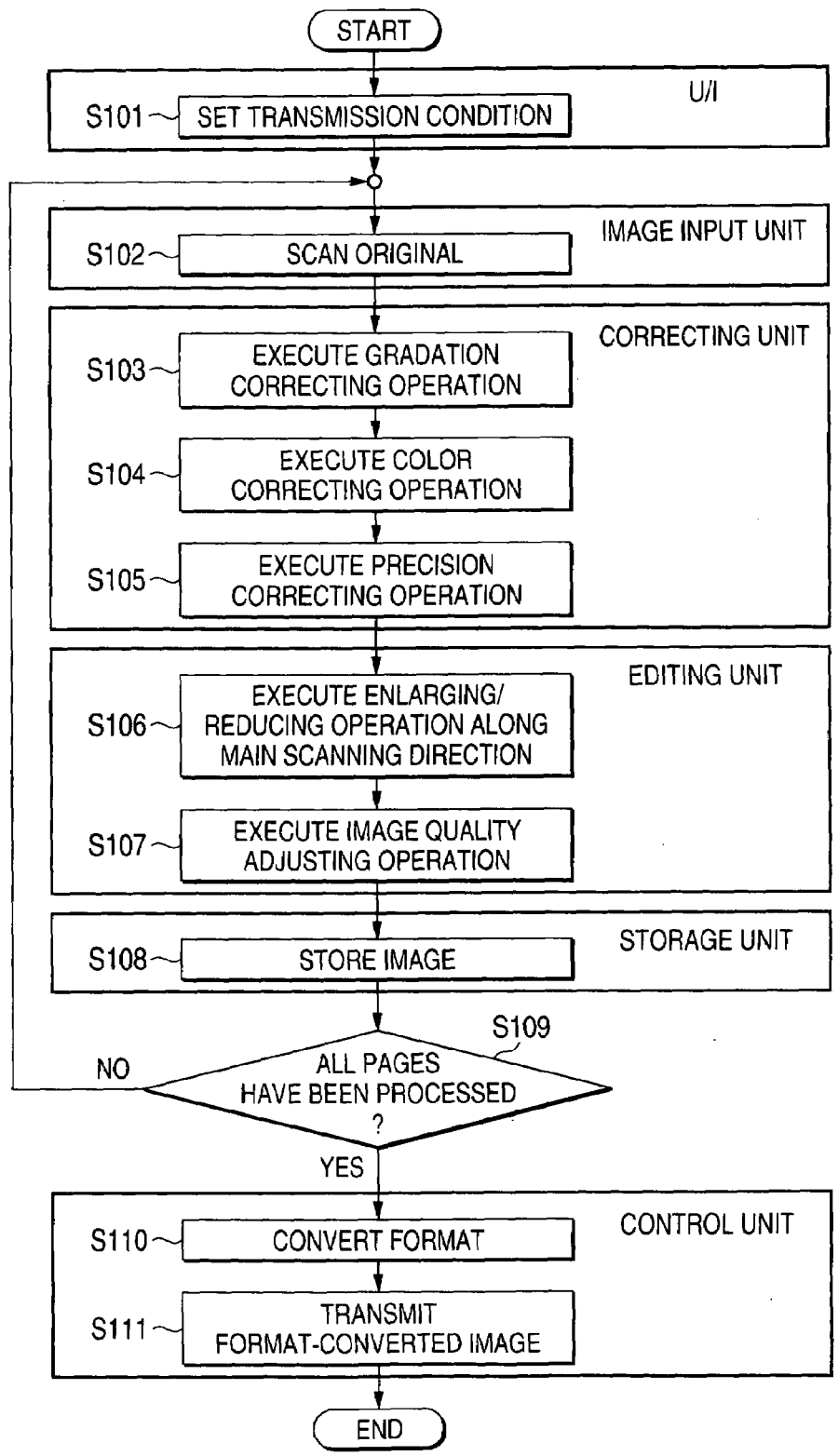
FIG. 2 is a flow chart for explaining operations of the transmission side according to the first embodiment of the invention.

FIG. 2 is a flow chart for describing an example of operations of the image processing apparatus provided on the transmission side according to the first embodiment of the present invention. In this flow operation, a normal operation is firstly explained, and thereafter, an operation executed in case of the "N-up" function is explained. In a step S101, various process setting operations are carried out in the U/I 17, which are related to a sort of original, a process mode, and information of external devices transmitted. Subsequently, in a step S102, the set original is read in the image input unit 11. In this case, the reading operation of this original is realized by that the original is optically read by a main scanning operation by using a one-dimensionally arrayed CCD sensor along a sensor array direction, and also, both the original and this CCD sensor are relatively moved by a sub-scanning operation along a direction perpendicular to the sensor array direction. Since this original reading operation is carried out by the image input unit 11, a color image signal is produced from the original, which owns resolution of, for example, 400 dpi (400 dots per 25.4 mm) by 8-bit gradation as to each of R(red) color, G(green) color, B(blue) color per one pixel. Also, in the case that either an enlarging process operation or a reducing process operation is carried out, either the enlarging process operation or the reducing process operation along the sub-scanning direction may be realized by controlling a move speed of the sub-scanning direction in this image processing unit 11. In this example, it is so assumed that either the enlarging process operation or the reducing process operation is carried out by employing this method.

Figure 3:
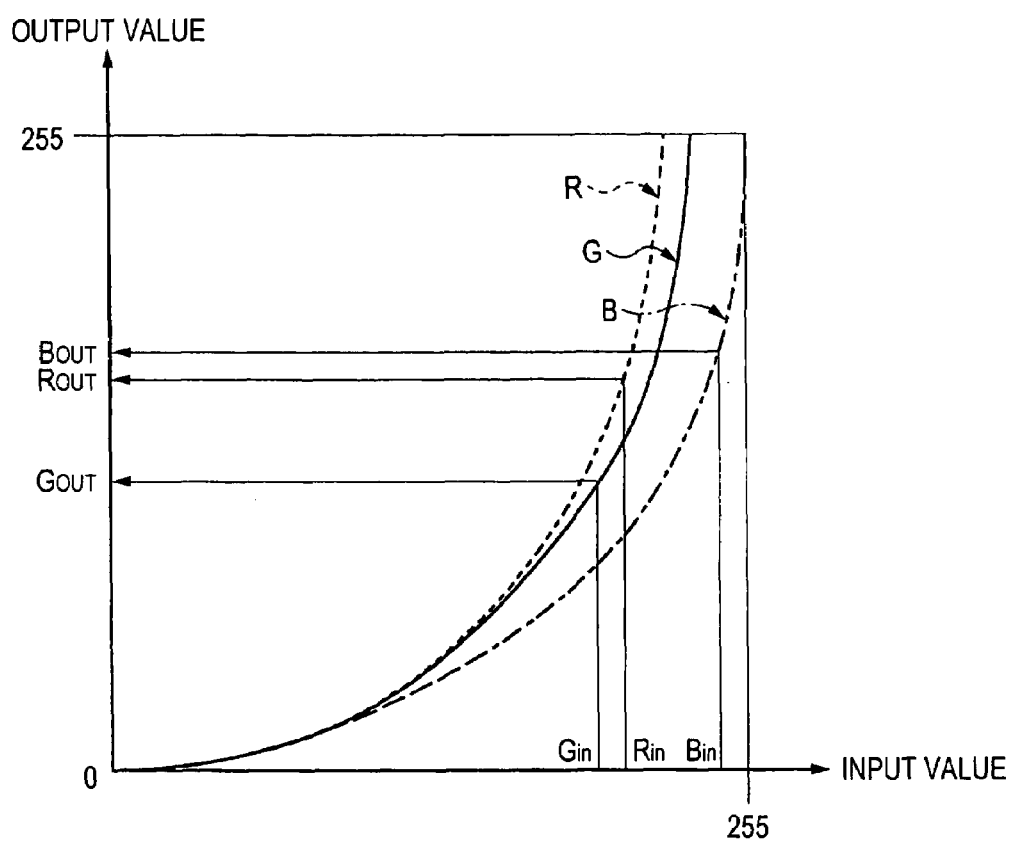
FIG. 3 is an explanatory diagram for explaining one example of a gradation correcting process operation.

The RGB-color digital image signals produced in the image input unit 11 are entered into the correcting unit 13 employed in the image processing unit 12. Then, a gradation correcting process operation is executed by the known manner in a step S103, also, a color correcting process operation is executed by the known manner in a step S104, and furthermore, a precision correcting process operation is executed by the known manner in a step S105. FIG. 3 is an explanatory diagram for explaining an example of the gradation correcting process operation. As indicated in FIG. 3, the gradation correcting process operation corresponds to such a process operation for correcting both a gray balance and a gradation characteristic of each of R, G, B colors. In this drawing, symbols "Rin", "Gin", and "Bin" show pixel values before the gradation correcting process operations are executed, and symbols "Rout", "Gout", "Bout" represent pixel values after the gradation correcting process operations are carried out. As a realizing example, a correspondence relationship between input (before gradation correction) pixel values and output (after gradation correction) pixel values is previously obtained by employing such converting curves as shown in FIG. 3 to form a one-dimensional lookup table (will be referred to as an "LUT" hereinafter) An output (after gradation correction) pixel value may be obtained based upon an input (before gradation correction) pixel value with reference to the LUT.

The color correcting process operation is to correct the color characteristic of the image input unit 11, and may be realized in such a manner that the below-mentioned matrix calculation is carried out by employing a preset coefficient:

$$\begin{bmatrix} R_{out} \\ G_{out} \\ B_{out} \end{bmatrix} = \begin{bmatrix} \alpha_{11} & \alpha_{21} & \alpha_{31} & \alpha_{41} & \alpha_{51} & \alpha_{61} & \alpha_{71} & \alpha_{81} & \alpha_{91} \\ \alpha_{12} & \alpha_{22} & \alpha_{32} & \alpha_{42} & \alpha_{52} & \alpha_{62} & \alpha_{72} & \alpha_{82} & \alpha_{92} \\ \alpha_{13} & \alpha_{23} & \alpha_{33} & \alpha_{43} & \alpha_{53} & \alpha_{63} & \alpha_{73} & \alpha_{83} & \alpha_{93} \end{bmatrix} \times \begin{bmatrix} R_{in} \\ G_{in} \\ B_{in} \\ G_{in} \times B_{in} \\ R_{in} \times B_{in} \\ R_{in} \times G_{in} \\ R_{in}^2 \\ G_{in}^2 \\ B_{in}^2 \end{bmatrix} + \begin{bmatrix} \beta_1 \\ \beta_2 \\ \beta_3 \end{bmatrix}$$

In this matrix calculation, symbols "Rin", "Gin", "Bin" show pixel values before the color correcting process operation is executed; symbols "Rout", "Gout", "Bout" denote pixel values after the color correcting process operation is carried out; symbols "α11" to "α39" represent multiplication coefficients; and symbols "β1" to "β3" indicate addition coefficients. It should be noted that when such an instruction is made by the U/I 17 that the color correcting process operation is carried out in the black/white mode, an image for black/white-processing operation is produced by employing a monochromatic calculation coefficient in this color correcting process operation.

Figure 4:
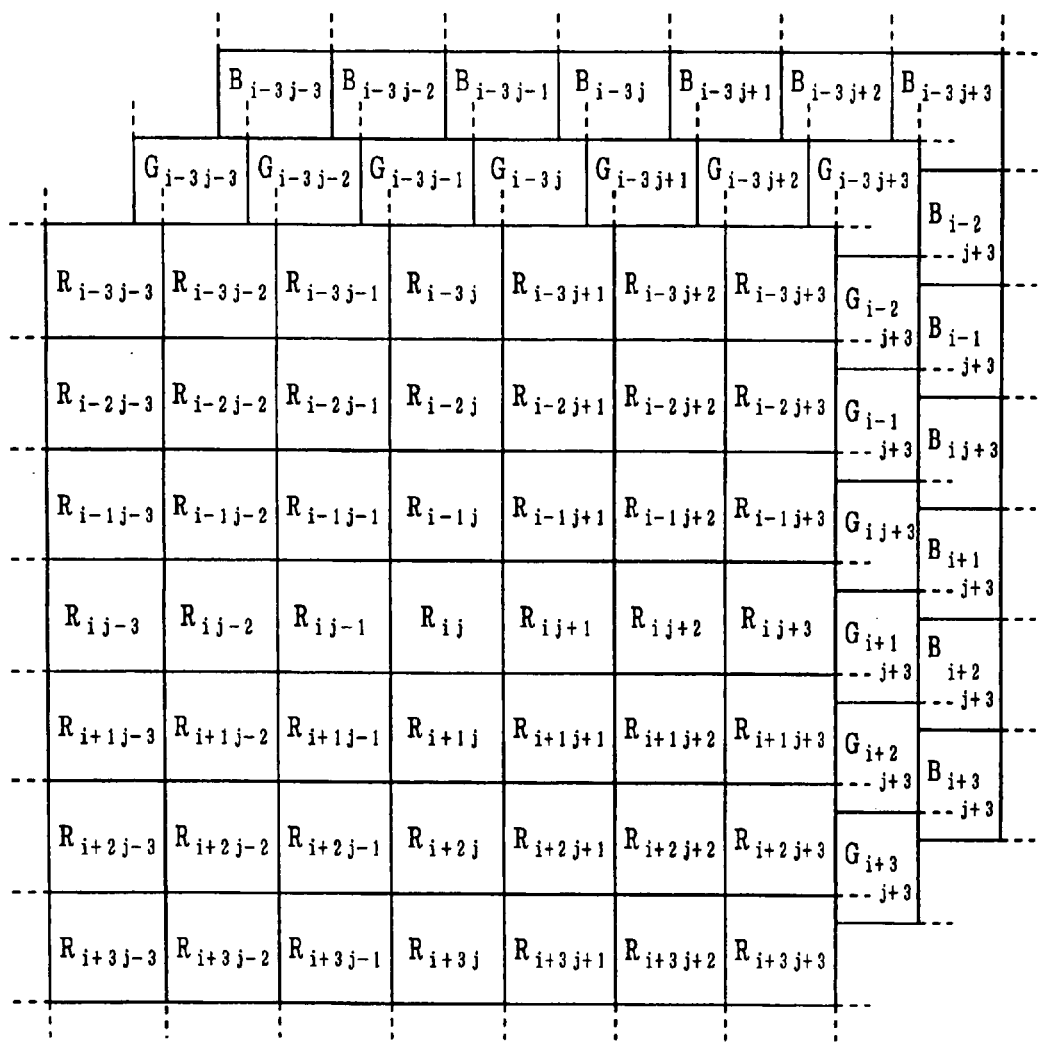
FIG. 4 is an explanatory diagram for explaining process pixels in one example of a precision correcting process operation.

FIG. 4 and FIG. 5 are explanatory diagrams for explaining an example of the precision correcting process operation. This precision correcting process operation is to correct the spatial characteristic of the image input unit 11, and may be realized by executing a convolution calculation of 7×7 pixels while a pixel of interest is located as a center, as indicated in FIG. 4 and FIG. 5. FIG. 4 shows 7×7 pixels in a color image, and FIG. 5 indicates multiplication coefficients in the respective pixel positions. The convolution calculation may be calculated as follows:

$$\begin{cases} (R_{i,j})_{out} = \sum_{m=1}^{7} \sum_{n=1}^{7} (R_{i-4+m, j-4+m})_{in} \times K_{m,n} \\ (G_{i,j})_{out} = \sum_{m=1}^{7} \sum_{n=1}^{7} (G_{i-4+m, j-4+m})_{in} \times K_{m,n} \\ (B_{i,j})_{out} = \sum_{m=1}^{7} \sum_{n=1}^{7} (B_{i-4+m, j-4+m})_{in} \times K_{m,n} \end{cases}$$

In this convolution calculation, symbols "(Rij)in", "(Gij)in", "(Bij)in" show pixel values before the precision correcting process operation is performed; symbols "(Rij)out", "(Gij)out", "(Bij)out" show pixel values after the precision correcting process operation is carried out; and symbol "Km,n" indicates multiplication coefficient indicated in FIG. 5.

The RGB-color digital image signals to which the above-described correcting process operations have been executed are outputted to the editing unit 14. In other words, various sorts of correcting process operations, namely, the gradation correcting process operation defined in the step S103, the color correcting process operation defined in the step S104, and the precision correcting process operation defined in the step S105 have been carried out with respect to the RGB-color digital image signals, and the characteristic of the image input unit 11 has been corrected.

In the editing unit 14, a magnification changing process operation of an image defined in a step S106 is executed, and an adjusting process operation of an image quality defined in a step S107 is carried out. As previously explained, in this example, both the enlarging process operation and the reducing process operation along the sub-scanning direction are realized by controlling the original scanning speed by the image input unit 11. As a consequence, in the editing unit 14, a one-dimensional enlarging process operation and a one-dimensional reducing process operation are carried out by way of the known interpolation calculating process operation with respect to the main scanning direction of the image, and both a two-dimensional enlarging process operation and a two-dimensional reducing process operation may be realized in combination with the magnification changing process operation along the sub-scanning direction by the image input unit 11. Also, in the editing unit 14, an image quality adjusting process operation such as contrast, brightness, color balance, sharpness, color hue, and saturation is also carried out. The color quality adjusting process operation as to the contrast, the brightness, and the color balance may be realized by executing, for example, a gamma adjusting process operation with reference to the known one-dimensional LUT with employment of a preset correction curve. The sharpness adjustment may be realized by executing a convolution calculation with employment of preset multiplication coefficients with respect to, for example, 5×5 pixels while an interest pixel is located at a center. Also, both the color hue adjustment and the saturation adjustment may be realized by executing, for instance, the following matrix calculation:

$$\begin{bmatrix} R_{out} \\ G_{out} \\ B_{out} \end{bmatrix} = \begin{bmatrix} \gamma_{11} & \gamma_{21} & \gamma_{31} \\ \gamma_{12} & \gamma_{22} & \gamma_{32} \\ \gamma_{13} & \gamma_{23} & \gamma_{33} \end{bmatrix} \times \begin{bmatrix} R_{in} \\ G_{in} \\ B_{in} \end{bmatrix} + \begin{bmatrix} \delta_1 \\ \delta_2 \\ \delta_3 \end{bmatrix}$$

In this matrix calculation, symbols "Rin", "Gin", "Bin" show pixel values before being processed; symbols "Rout", "Gout", "Bout" indicate pixel values after being processed; symbols "γ11" to "γ33" represent multiplication coefficients; and also symbols "δ1" to "δ3" are addition coefficients.

In a step S108, the storage unit 15 stores thereinto image data entered from the editing unit 14, to which both the correcting process operation and the editing process operation have been completed.

In a step S109, the control unit 16 judges as to whether or not the reading operations as to all pages of images are accomplished. In the case that there is such an original whose image has not yet been read, the process operation is returned to the previous step S102, so that process operations subsequent to reading operation of images by the image input unit 11 will be carried out in a similar manner. Thus, all pages of the image data are stored into the storage unit 15.

A format of image data stored in the storage unit 15 is converted into a predetermined format used to be transmitted by the control unit 16 in a step S110. In a step S111, the image data having this predetermined format, which is produced by the control unit 16, is transmitted via the I/O 18 to the external device set by the U/I 17, so that a series of image processing operations is completed.

Figures 6, 7:
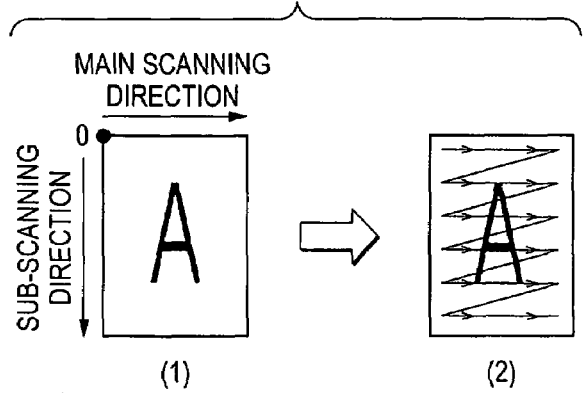
FIG. 6 is an explanatory diagram for explaining one example of a format converting process operation.
FIG. 7 is an explanatory diagram for explaining one example of a storage processing operation of an image in the case that the normal image transmission not by the "N-up" function is carried out.

FIG. 6 is an explanatory diagram for explaining an example of a format converting process operation. As shown in FIG. 6 in this example, both resolution and a compression system of an image to be transmitted are controlled in response to a mode which indicates as to whether a chromatic color is present, and also indicates a sort of original, so that both a data amount and an image quality of an image to be transmitted are optimized. In this case, a converting process operation of a color original into a black/white original is carried out as a color correcting process operation by the above-described correcting unit 13, whereas both a resolution converting operation and a compressing process operation are carried out as a format converting process operation by the control unit 16. Also, as both the sort and the mode, the transmission condition set from the U/I 17 in the step S101 may be utilized.

Next, a description will be given on an example of flow of an image processing operation executed when the "N-up" function is realized by similarly using FIG. 2. First, in the step S101, when various transmission conditions are set by the U/I 17, the "N-up" process operation is designated. Then, in the step S102, reading operation of an image formed on an original is carried out by a changed magnification in response to the transmission condition set in the step S101. Subsequently, correcting process operations such as the gradation correcting operation (step S103), the color correcting operation (step S104), and the precision correcting operation (step S105), similar to above-explained correcting process operations are carried out. In the editing unit 14, both a magnification changing process operation (step S106) of the image along the main scanning direction, and an adjusting process operation (step S107) of an image quality are carried out in response to the designated "N-up" function.

Figure 8:
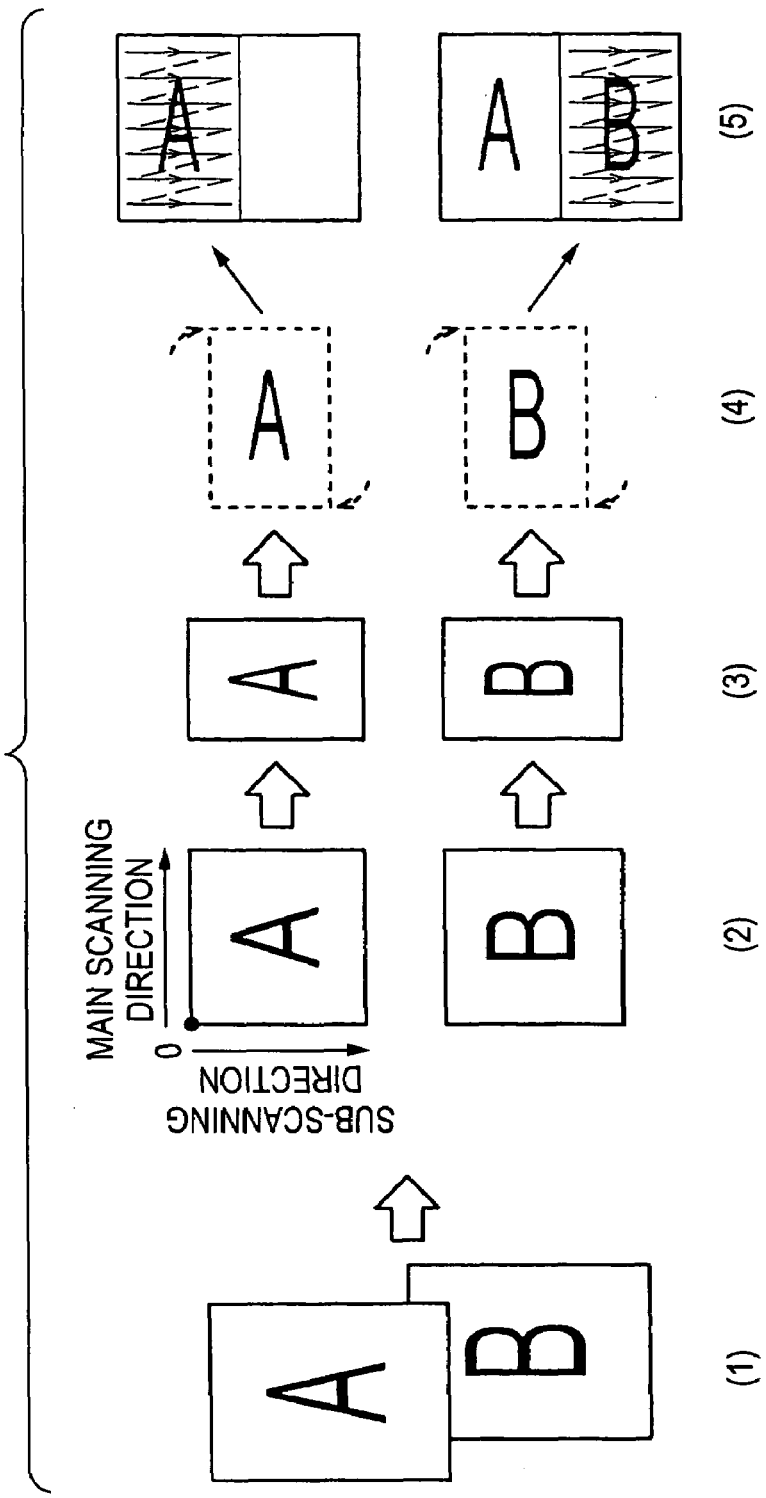
FIG. 8 is an explanatory diagram for explaining an example of storage processing operation of image data in the case of "2-up" processing operation.
Figure 9:
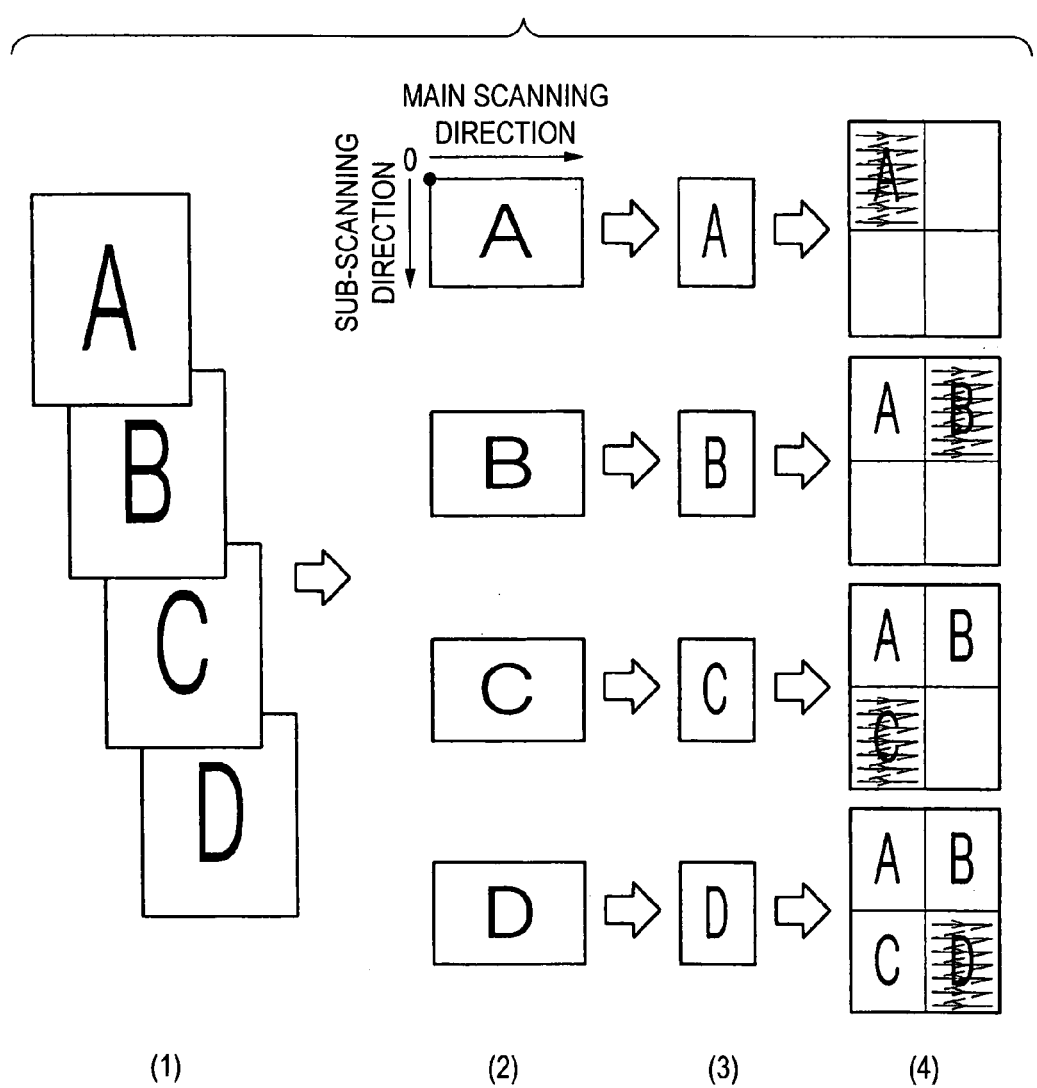
FIG. 9 is an explanatory diagram for explaining an example of storage processing operation of image data in the case of "4-up" processing operation.

The storage unit 15 stores the image data to which the above-described process operations have been accomplished into a page memory. FIG. 7 is an explanatory diagram for explaining one example of a storage process operation of an image in the case that the normal image transmission (not "N-up" process operation) is carried out. FIG. 8 and FIG. 9 are explanatory diagrams for explaining one example of storage process operation of image data in such a case that the "N-up" process operation is carried out. FIG. 7(1) indicates such an image which has been read by the image input unit 11, and then, has been processed by both the correcting unit 13 and the editing unit 14. In this drawing, arrow-lines along both a horizontal direction and a vertical direction show a main scanning direction and a sub-scanning direction, respectively, and a point "O" located at an upper left position shows an origin (0, 0) of the image. FIG. 7(2) represents that an image to which both the correcting process operation and the editing process operation have been executed is stored into the page memory employed in the storage unit 15. In this drawing, an arrow schematically shows a sequential order at which pixel values of the above-described described image are stored into the page memory.

FIG. 8 shows such a case that image data to which the "two-up" process operation has been executed is stored into the storage unit 15. FIG. 8(1) indicates an original to which the "2-up" editing operation is carried out. In this drawing, symbols "A" and "B" represent a first original image and a second original image, respectively. In this case, it is so assumed that the original image "A" is arranged at a left half portion of images obtained after the "2-up" editing operation is performed, and the original image "B" is arranged at a right half portion thereof. FIG. 8(2) conceptually indicates a digital color image read by the image input unit 11. In this drawing, an arrow-line of a horizontal direction shows a main scanning direction, an arrow-line of a vertical direction indicates a sub-scanning direction, and a point "O" located at an upper left position denotes an origin (0, 0) of this digital color image similar to those of FIG. 7.

In general, when the "N-up" process operation is carried out, there are many cases that a magnification changing operation is carried out, especially, a reducing process operation is carried out in response to a dimension of an original and a dimension of a synthesized image. In this example, a magnification changing operation with respect to the sub-scanning direction is carried out by the image input unit 11, whereas a magnification changing operation with respect to the main scanning direction is performed by the editing unit 14. As a consequence, as indicated in FIG. 8(2), an image outputted from the image input unit 11 constitutes such an image to which the reducing process operation is carried out only along the sub-scanning direction. FIG. 8(3) shows such an image that after the correcting process operation has been performed based upon an attribute of an original by the correcting unit 13 employed in the image processing unit 12, the magnification changing process operation with respect to the main scanning direction is carried out by the editing unit 14. FIG. 8(4) and FIG. 8(5) conceptually indicate storage conditions that the images shown in FIG. 8(3) are stored into the page memory employed in the storage unit 15. As illustrated in FIG. 8(5), both the original image "A" and the original image "B" are placed side by side with each other in such a manner that a writing start coordinate value of the image and a writing direction thereof are made different from those of such a case that the normal process operation is executed as shown in FIG. 7. It should be understood that when the original image "B" is written, a writing start coordinate value thereof may be made different from that of the original image "A."

FIG. 9 shows such a case that image data to which the "four-up" process operation has been executed is stored into the storage unit 15. FIG. 9(1) indicates an original to which the "4-up" editing operation is carried out. In this drawing, symbols "A", "B", "C", and "D" represent a first original image, a second original image, a third original image, and a fourth original image, respectively. In this case, images which have been edited by the "4-up" editing operation in the case that an origin is located at an upper left edge portion are assumed to be instructed in such a manner that the original image "A" is placed at an upper left portion; the original image "B" is placed at an upper right portion; the original image "C" is placed at a lower left portion; and the original image "D" is placed at a lower right portion. FIG. 9(2) conceptually indicates a digital color image read by the image input unit 11. In this drawing, an arrow-line of a horizontal direction shows a main scanning direction, and an arrow-line of a vertical direction indicates a sub-scanning direction, and a point "O" located at an upper left position denotes an origin (0, 0) of this digital color image similar to those of FIG. 7. Similar to the example of FIG. 8, as indicated in FIG. 9(2), an image outputted from the image input unit 11 constitutes such an image to which the reducing process operation is carried out only the sub-scanning direction. FIG. 9(3) shows such an image that after the correcting process operation has been performed by the correcting unit 13 employed in the image processing unit 12, the magnification changing process operation with respect to the main scanning direction is carried out by the editing unit 14. FIG. 9(4) conceptually indicates storage conditions that the images shown in FIG. 9(3) are stored into the page memory employed in the storage unit 15. As illustrated in FIG. 9(4), both original images "A", "B", "C", and "D" are placed side by side with each other in a designated layout in such a manner that writing start coordinate values of these images are made different.

The format of the synthesized image stored in the storage unit 15 in the above-described manner is converted into a predetermined format required for a preselected transmission by the control unit 16 in a similar manner to that of the normal processing operation. First, an attribute of the synthesized image is determined based upon attributes of original images to be synthesized, and both predetermined resolution and a predetermined compressing system are set.

It should be noted that an attribute expressed in this specification indicates both a mode and a sort of such an original shown in FIG. 6. An attribute of a synthesized image may be determined by, for example, selecting such an attribute to which the highest image quality is required from attributes of the respective original images. Concretely speaking, since a color original requires a higher image quality as compared with a black/white original, a mode of a full color is selected. Also, a character/photograph-mixed original requires a higher image quality, as compared with a photograph original and a character original, in which any one of gradation and resolution is required in a top priority. As to a map original which furthermore requires both higher resolution and superior gradation, a reproducing process operation with a high image quality is required.

As a consequence, for example, an attribute of a synthesized image which is formed from both a black/white original and a photograph original by the "2-up" processing operation may be determined based upon the black/white character/photograph image, and then, an MMR reducing process operation in the resolution of 400 dpi is selected from FIG. 6. Also, an attribute of a synthesized image which is formed from both a color character original and a black/white map original by the "2-up" processing operation may be determined based upon the color map original, and the JPEG reducing process operation in the resolution of 400 dpi is selected from FIG. 6. After the above-described attribute selecting operation of the synthesized image has been carried out, the synthesized image held in the storage unit 15 is transferred to the control unit 16, and both the resolution converting operation and the reducing process operation are carried out in accordance with the determined attribute.

Figure 10:
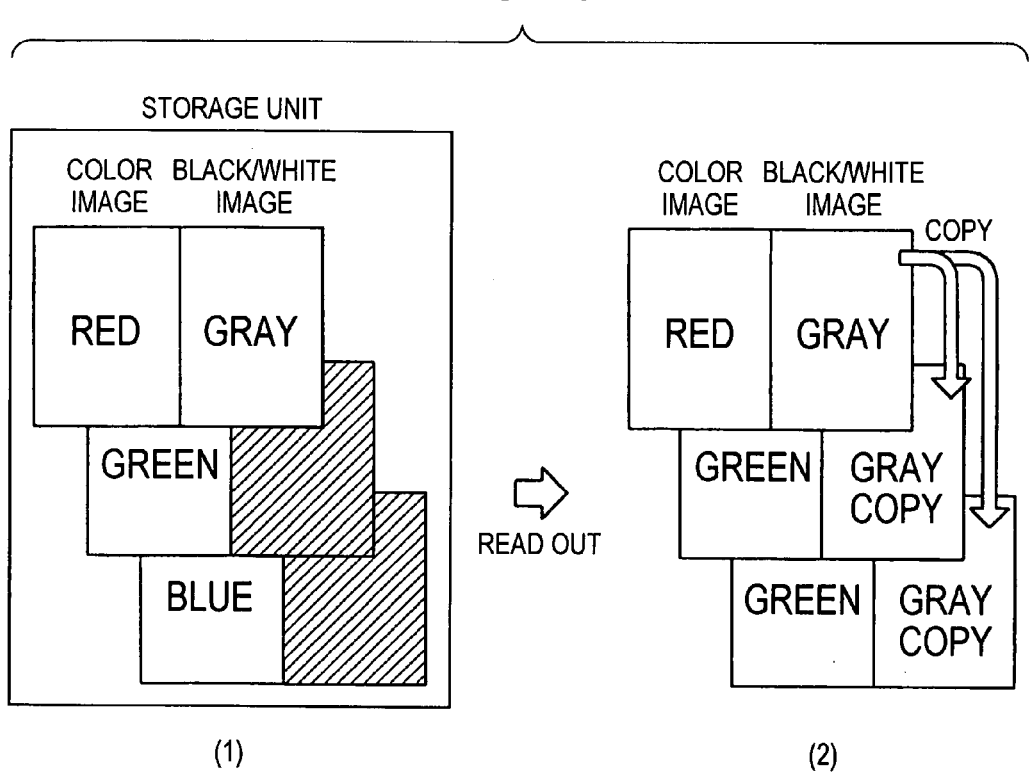
FIG. 10 is an explanatory diagram for explaining an example of reading process operation with respect to a synthesized image when the "2-up" synthesizing operation is performed in which a color original is mixed with a black/white original.

In the case of such "N-up" function in which a color original and a block/white original are mixed, color images (will be indicated as "Red", "Green", and "Blue") represented by three planes and a black/white image (will be indicated as "Gray") represented by one plane are mixed to be held in the storage unit 15. FIG. 10 is an explanatory diagram for explaining an example of a reading process operation with respect to a synthesized image produced based upon the "2-up" function in which a color original and a black/white original are mixed. As previously explained, in the case that a color image and a black/white image are mixed, a synthesized image may be desirably processed as the color image. As a result, as indicated in FIG. 10, in such a case, when image data stored in the storage unit 15 is read to the control unit 16, a portion of the black/white image may be copied on the three planes of RGB colors (namely, image indicated as "Gray copy" in this drawing). As a consequence, also as to the black/white image, this image may be handled in a similar manner to the color image.

The "N-up" image data which becomes the reduced image having the resolution selected in the above-explained manner is temporarily stored in a RAM employed in the control unit 16. Subsequently, the "N-up" image data is converted into transmission data having a predetermined format. In this case, as an image data format for transmission purposes, various known formats may be utilized. As one example of the transmission image data formats, the TIFF (Tagged Image File Format) is used which is widely known as the image format having the superior extendibility. At this time, such an information required for realizing the "N-up" function is defined as a private data field, and then, this private data field is additionally provided in transmission data so as to be transferred to an external device. For instance, five pieces of the below-mentioned information may be preferably added to a TIFF file as private data capable of realizing the "N-up" function:

(a) Information used to indicate that image data to be transmitted corresponds to an "N-up" image which is produced by synthesizing a plurality of originals;

(b) total number of originals synthesized within a single image;

(c) information related to modes and sorts of respective originals employed in an image synthesization;

(d) information indicative of total number of originals which are arranged along a main scanning direction and a sub-scanning direction; and (e) information representative of a relationship between a reading sequence of originals and an arrangement of these original on a synthesized image.

Figure 11:
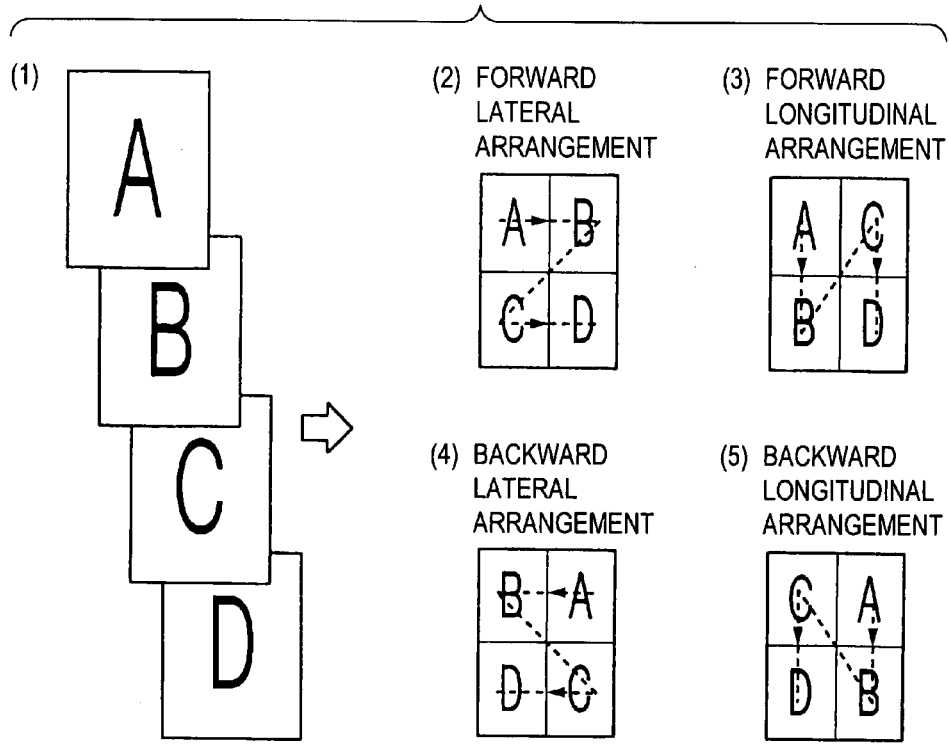
FIG. 11 is an explanatory diagram for explaining an example of an arranging relationship among respective images when the "N-up" process operation is carried out.

FIG. 11 is an explanatory diagram for explaining one example of an arranging relationship of respective images when the "N-up" process operation is carried out. In this case, the above-described additional information (d) and (e) will be explained. FIG. 11 indicates such an example that a so-called "4-up" image is produced by using four sheets of original images shown in FIG. 11(1). In the "4-up" image, two sheets of these original images are arranged along the main scanning direction, and two sheets of these original images are arranged along the sub-scanning direction. At this time, such an information indicating that two original images are arranged along the main scanning direction and two original images are arranged along the sub-scanning direction among the four original images corresponds to the above-described additional information (d). Also, such an information corresponds to the above-explained additional information (e). That is, this information indicates that four sheets of originals are arranged based upon any of layouts, namely a "forward lateral arrangement" shown in FIG. 11(2); a "forward longitudinal arrangement" indicated in FIG. 11(3); a "backward lateral arrangement" represented in FIG. 11(4); and a "backward longitudinal arrangement" denoted in FIG. 11(5).

The data for transmission purposes, which has been produced by the control unit 16 in the above-described manner, is transmitted via the system bus 19 and the I/O 18 to the network.

Figure 12:
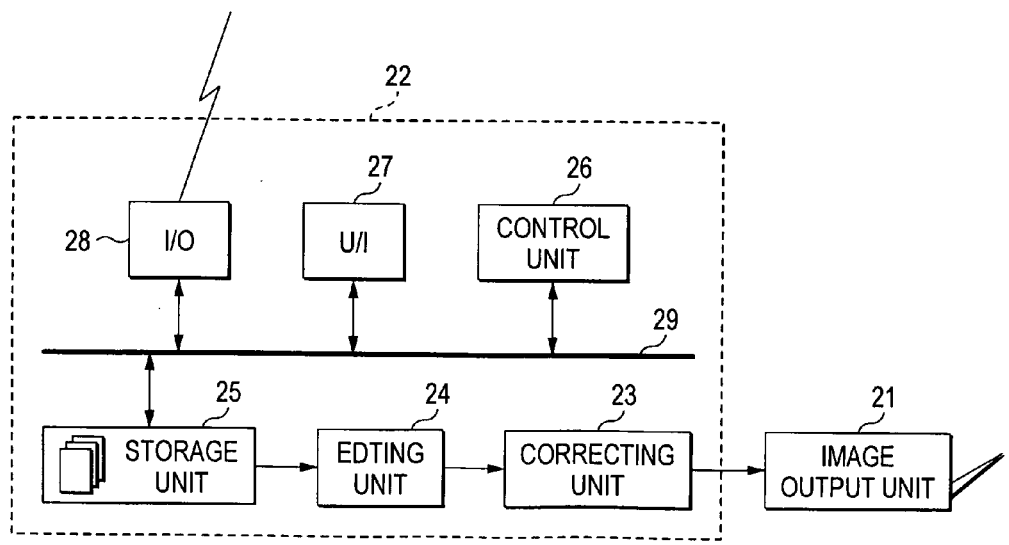
FIG. 12 is a block diagram for indicating an arrangement of an image processing apparatus provided on the reception side according to the first embodiment of the present invention.

FIG. 12 is a schematic block diagram for indicating an arrangement of an image processing apparatus provided on a reception side, according to the first embodiment of the present invention. In this drawing, reference numeral 21 shows an image output unit, reference numeral 22 indicates an image processing unit, reference numeral 23 represents a correcting unit, and reference numeral 24 denotes an editing unit. Also, reference numeral 25 shows a storage unit, reference numeral 26 indicates a control unit, reference numeral 27 represents a U/I, reference numeral 28 shows an I/O and also, reference numeral 29 indicates a system bus. The image output unit 21 owns, for example, an electronic photographic type image forming section, and records/outputs a digital color image. The below-mentioned description is assumed that the image output unit 21 forms an image by using four colors constructed of a Y (yellow) color, an M (magenta) color, a C (cyan) color, and a K (black) color. Apparently, the present invention is not limited to this example.

The image processing unit 22 produces/processes a digital image signal which is outputted to the image output unit 21. The image processing unit 22 is constituted by the correcting unit 23, the editing unit 24, the storage unit 25, the control unit 26, the U/I 27, the I/O 28, the system bus 29, and the like. The correcting unit 23 is to perform such a process operation that a color characteristic, a gradation characteristic, and a spatial characteristic of the image output unit 21 are corrected. The image processing unit 22 produces, for example, a 4-color image made of Y, M, C, K colors which are used when an image is formed in the image output unit 21. The editing unit 24 executes an enlarging process operation and a reducing process operation of an image. More specifically, the editing unit 24 owns a function capable of making resolution of received image data identical to resolution of the image output unit 21. The storage unit 25 corresponds to a storage section capable of storing thereinto an amount of at least one page of images. The control unit 26 is constructed of, for example, a CPU, a ROM, a RAM, and the like. The control unit 26 executes a portion of the image processing operations, and also controls the image processing unit 22. The U/I 27 is a user interface which is used by a user who instructs operations executed in both the image output unit 21 and the image processing unit 22, and which displays a state of the system, and an error. The I/O 28 is an input/output section used to connect to a network. The system bus 29 corresponds to a local bus used to connect the above-described respective processing units.

Figure 13:
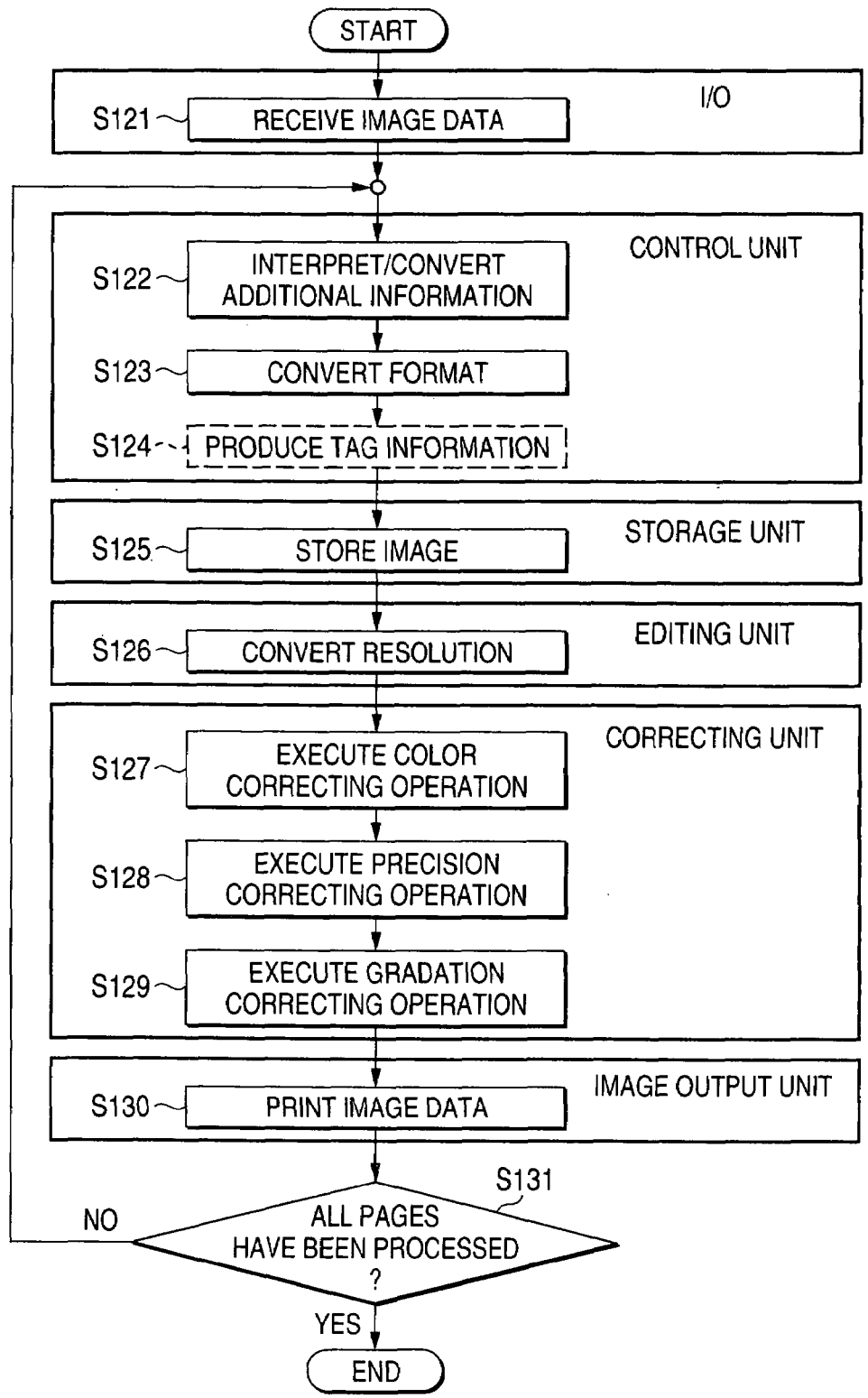
FIG. 13 is a flow chart for describing operations of the image processing apparatus provided on the reception side according to the first embodiment of the present invention.

FIG. 13 is a flow chart for describing an example of operations of the image processing apparatus provided on the reception side according to the first embodiment of the present invention. In this flow operation, in a first step S121, this image processing apparatus provided on the reception side receives such an image data which is transmitted via the I/O 28 from the image processing apparatus provided on the transmission side shown in FIG. 1, and temporarily stores the received image data into the RAM employed in the control unit 26. The control unit 26 firstly extracts from the received image data having a predetermined format document information indicative of total page number, total print quantity, a designation of paper, a double-face print, designation/non-designation of an "N-up" original, and so on.

Next, in a step S122, the control unit 26 interprets additional information in the unit of each page so as to extract resolution and a color mode of an output image, and also extract a sort of an original, and then, this control unit 26 sets process conditions in the editing unit 24 and the correcting unit 23 (will be explained later). Subsequently, in a step S123, the control unit 26 executes an expanding process operation as to the reduced image data, and transfers the expanded image data via the system bus 29 to the storage unit 25. In a step S125, the control unit 26 stores the transferred image data into the storage unit 25. In the case that this output image corresponds to such a synthesized image by the "N-up" processing operation, the control unit 26 produces such an information (will be referred to as "Tag information" hereinafter) which contains the same pixel number as that of the output image, and also indicates both a color mode every one pixel and a sort of an original in a step S124. Then, the control unit 26 stores this Tag information into the storage unit 25 similar to the image data.

Figure 14:
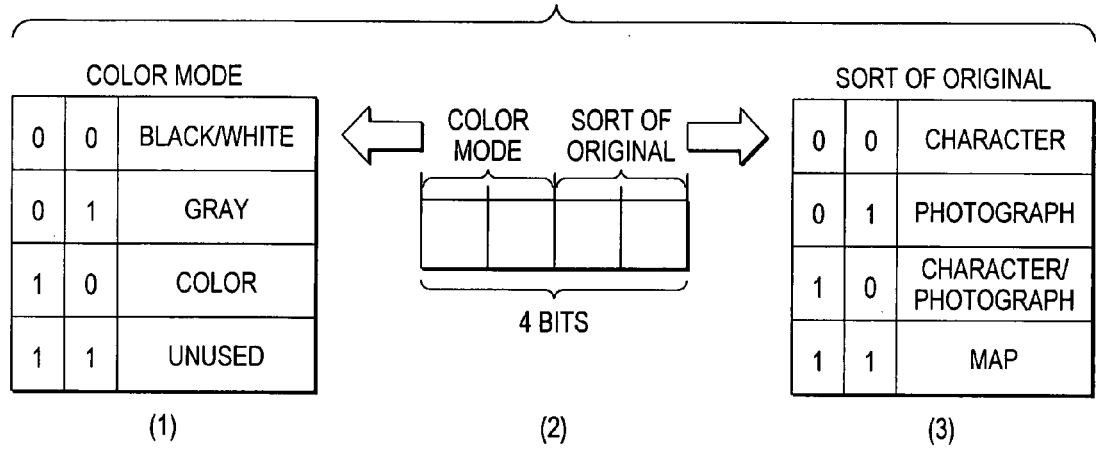
FIG. 14 is an explanatory diagram for explaining an example of Tag information.
Figure 15:
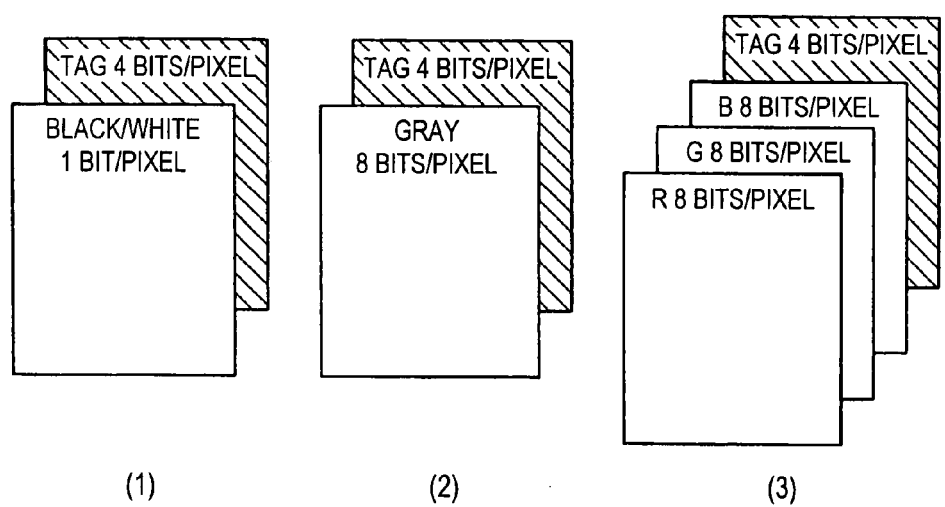
FIG. 15 is an explanatory diagram for explaining a relationship between image data and the Tag information.

FIG. 14 is an explanatory diagram for explaining an example of the Tag information. FIG. 15 is an explanatory diagram for explaining a relationship between image data and the Tag information. The Tag information contains such information indicative of a mode and a sort. For example, as indicated in FIG. 14(2), the Tag information may be constituted by 4 bits, namely, 2 bits indicative of a mode, and 2 bits representative of a sort. It should also be noted that as to 2 bits indicative of the mode, the mode expressed by the bit string is indicated in FIG. 14(1), and as to 2 bits indicative of the sort, the sort of original is shown in FIG. 14(3). Apparently, it should be understood that implications expressed by the respective bit strings are not limited to this example, but also, number of the bit may be arbitrarily selected, and the information contained in the Tag information may be arbitrarily selected.

Then, for example, as shown in FIG. 15, both the expanded image information and the Tag information having the same size as that of this expanded image information are stored in the storage unit 25. Depending upon modes of originals employed in an "N-up" image synthesizing operation, for example, as represented in FIG. 15(1), or FIG. 15(2), there is such a case that the Tag information becomes redundant. In this embodiment, the Tag information is unified to 4 bits/pixel for the sake of simple control characteristics of the entire system.

Returning back to the flow chart of FIG. 13, in the subsequent step S126, the editing unit 24 executes the linear interpolation calculations along both the main scanning direction and the sub-scanning direction, so that a two-dimensional resolution converting process operation is carried out. This resolution converting process operation corresponds to such a process operation that resolution of the received image is made coincident with the resolution of the image output unit 21. In such a case that the resolution of the received image is equal to the resolution of the image output unit 21, this resolution converting process operation is not executed. It should also be noted that process operations executed after the editing unit 24 correspond to such process operations with respect to a multi-value image. In the case that image data stored in the storage unit 25 corresponds to a binary image, while black pixels thereof are allocated to 255 and white pixels thereof are allocated to 0, image processing operations of the respective pixels are performed.

The correcting unit 23 produces a YMCK image formed in the image output unit 21, and also, executes an image correcting process operation in correspondence with the characteristic of the image output unit 21. First, in a step S127, in this correcting unit 23, a color correcting process operation for converting the entered RGB image into a YMCK image is carried out. In the color correcting process operation, for example, approximate positions within a three-dimensional RGB-color space are determined from 4-bit information of upper grades of the respective entered R, G, B signals so as to select a plurality of Y, M, C, K representative values, and also representative values are interpolated by employing 4-bit data of lower grades of the respective entered R, G, B signals. As a result, final Y, M, C, and K values may be obtained.

FIG. 16 is an explanatory diagram for explaining one example of the color correcting process operation. In this drawing, reference numeral 31 indicates a three-dimensional table, and reference numeral 32 shows an interpolation calculator. FIG. 16(2) shows an RGB-color space having 4,096 pieces of cross points, which is formed by upper 4-bit signals of R, G, B color signals. In other word, combinations of 17 points which are produced by subdividing each of the R, G, B axes constitute the respective cross points shown in FIG. 16(2). Since YMCK values are defined in correspondence with this cross point (RGB values), the RGB values may be converted into the YMCK values. The 3-dimensional table 31 shown in FIG. 16(1) is such a table which stores thereinto 4,096 pieces of YMCK values corresponding to, for instance, the cross points shown in FIG. 16(2). From this three-dimensional table 31, YMCK values corresponding to 12-bit (in total) data, namely 4 bit data of each of the entered R, G, B data, are outputted. At this time, in order to execute the interpolation calculation by the interpolation calculator 32 provided at the post stage of this table 31, Y, M, C, K data of eight cross points corresponding to 12-bit (in total) data, namely 4 bits of each of the entered R, G, B data are outputted to the interpolation calculator 32.

FIG. 16(3) is an explanatory diagram for explaining process operations executed in the interpolation calculator. In FIG. 16(3), symbols ($\Delta$r, $\Delta$g, $\Delta$b) indicate lower 4-bit values of inputted RGB data. Then, the interpolation calculator 32 executes the interpolation calculation by employing these lower 4 bit values ($\Delta$r, $\Delta$g, $\Delta$b) and the YMCK values corresponding to eight cross points of (r1, g1, b1), (r1, g1, b2), - - - , (r2, g2, b2) which are determined by the upper 4 bits, so that output Y, M, C, K values (y out, m out, c out, k out) can be determined.

As apparently, there are many sorts of color correcting process operations containing the color spatial converting operation. Other various sorts of color correcting process operations known in this technical field may be employed also in the image processing apparatus of the present invention.

Returning back to the flow chart of FIG. 13, in the next step S128, the precision correcting operation realized by executing, for example, the known convolution calculation shown in FIG. 4 and FIG. 5 with respect to the YMCK image produced by the color correcting process operation. Further, in a step S129, the gradation correcting process operation is performed by executing such a known manner that, for instance, an one-dimensional LUT as shown in FIG. 3 is referred. While optimum processing parameters are previously prepared in response to modes and sorts as to the above-explained color correcting process operation, precision correcting process operation, and gradation correcting process operation, these optimum processing parameters may be properly switched based upon a mode and a sort of an image to be outputted.

The YMCK image signal which has been processed in this manner is transmitted to the image output unit 21, and then, an image is formed in the image output unit 21 in a step S130. In a step S131, the control unit 26 judges as to whether or not image forming of all pages is accomplished. If there is an image which has not yet processed, then the process operation is returned to the previous step S122. In this step S122, the above-explained process operations are repeatedly carried out plural times equal to total number of pages of received images. As previously explained, the image forming process operations of the received images may be realized.

As previously explained, when the "N-up" processing operation is carried out, since the image processing apparatus provided on the reception side can produce the Tag information to execute the correcting process operation and the image forming operation by employing the information as to the modes and the sorts of the respective originals which are transmitted from the image processing apparatus provided on the transmission side and are used to be synthesized, this image processing apparatus can produce the "network copy" having the similar image quality to that of the "direct copy" even when the "N-up" function is used.

It should also be noted that in the above-described embodiment, in order to transfer the attributes of the "N-up" synthesized image to the image processing apparatus provided on the output side, the below-mentioned five pieces of information is added to the transmission data:

(a) Information used to indicate that image data to be transmitted corresponds to an "N-up" image which is produced by synthesizing a plurality of originals with each other;

(b) total number of originals synthesized within a single image;

(c) information related to modes and sorts of respective originals employed in an image synthesization;

(d) information indicative of total number of originals which are arranged along both a main scanning direction and a sub-scanning direction; and (e) information representative of a relationship between a reading sequence of originals and an arrangement of these original on a synthesized image.

Alternatively, another system may be effectively employed. That is, in the format converting operation defined in the step S110 of FIG. 2, such a system may be used in which while the "N-up" synthesized image is regarded as a single image, both a single mode and a single sort which are determined with respect to the synthesized image in order to execute both the resolution converting operation and the reducing process operation are employed as the attributes of the "N-up" synthesized image. This alternative system may have such a merit that the system can be made very simple as to a point that the additional information used to output only the "N-up" synthesized image is not especially required, and also as to another point that the editing/correcting process operations for referring to the Tag information, and the forming operation of the Tag information (step S124 of FIG. 13) are no longer required in the image processing apparatus provided on the output side.

Alternatively, another system may be conceived. That is, in the output processing operation of the "N-up" synthesized image, both one optimum mode and one optimum sort may be determined based upon modes of plural originals to be added and plural sorts thereof, and then, the correcting process operation may be carried out by the correcting unit 23 based upon these determined optimum mode and sort. Similar to the above-described alternative system, this system may own such a merit that the image processing apparatus provided on the output side may be made simple.

Figure 17:
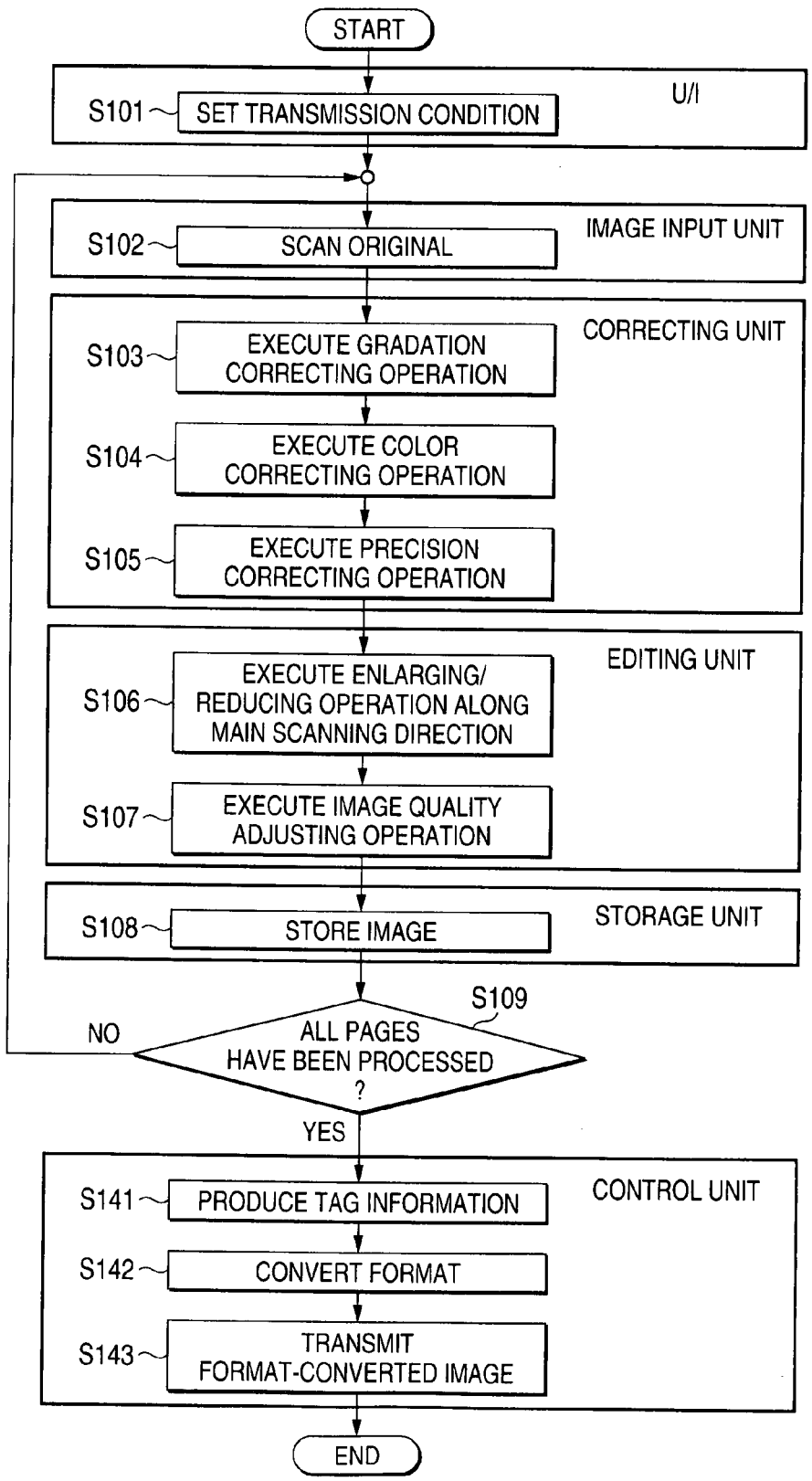
FIG. 17 is a flow chart for explaining an example of operations of a transmission side according to a second embodiment of the invention.

Next, a description will now be made of an image processing apparatus according to a second embodiment of the present invention. It should be noted that since both an arrangement provided on the transmission side and an arrangement provided on the reception side are similar to those of the first embodiment shown in FIG. 1 and FIG. 12, illustration and explanations thereof are omitted. FIG. 17 is a flow chart for describing an example of operations of the image processing apparatus provided on the transmission side according to the second embodiment of the present invention. In this drawing, it should be noted that a step in which a processing operation similar to that shown in FIG. 2 is performed is allotted the same reference numerals as FIG. 2. In other words, the process operations defined from the step S101 in which the transmission condition is set by the U/I 17 up to the step S108 in which the images are synthesized and the synthesized image is stored in the storage unit 15, and also the step S109 for judging whether or not the process operations as to all pages of the image are accomplished are similar to these of the above-described first embodiment.

In this second embodiment, after the image synthesizing operation has been completed in the storage unit 15, the control unit 16 produces Tag information by the unit of a pixel in a step S141. Concretely specking, while the control unit 16 refers to both modes and sorts of respective originals employed in the "N-up" synthesizing operation, a 4-bit Tag information signal per 1 pixel as indicated in FIG. 14 and FIG. 15 may be produced in the RAM employed in the control unit 16. Subsequently, in a step S142, the control unit 16 converts "N-up" image data stored in the storage unit 15 into a preselected format in correspondence with the Tag information produced in the step S141, and then transmits the format-converted "N-up" image data via the I/O 18 to an external device provided on a network. It should be understood that since pixels having the same pixel values are arrayed over a long distance in the Tag information, when the format converting operation is carried out in the step S142, a reversible reducing process operation is carried out with respect to the Tag information, so that the amount of the transmission data can be reduced, and thus, producibility of the "network copy" can be increased.

Figure 18:
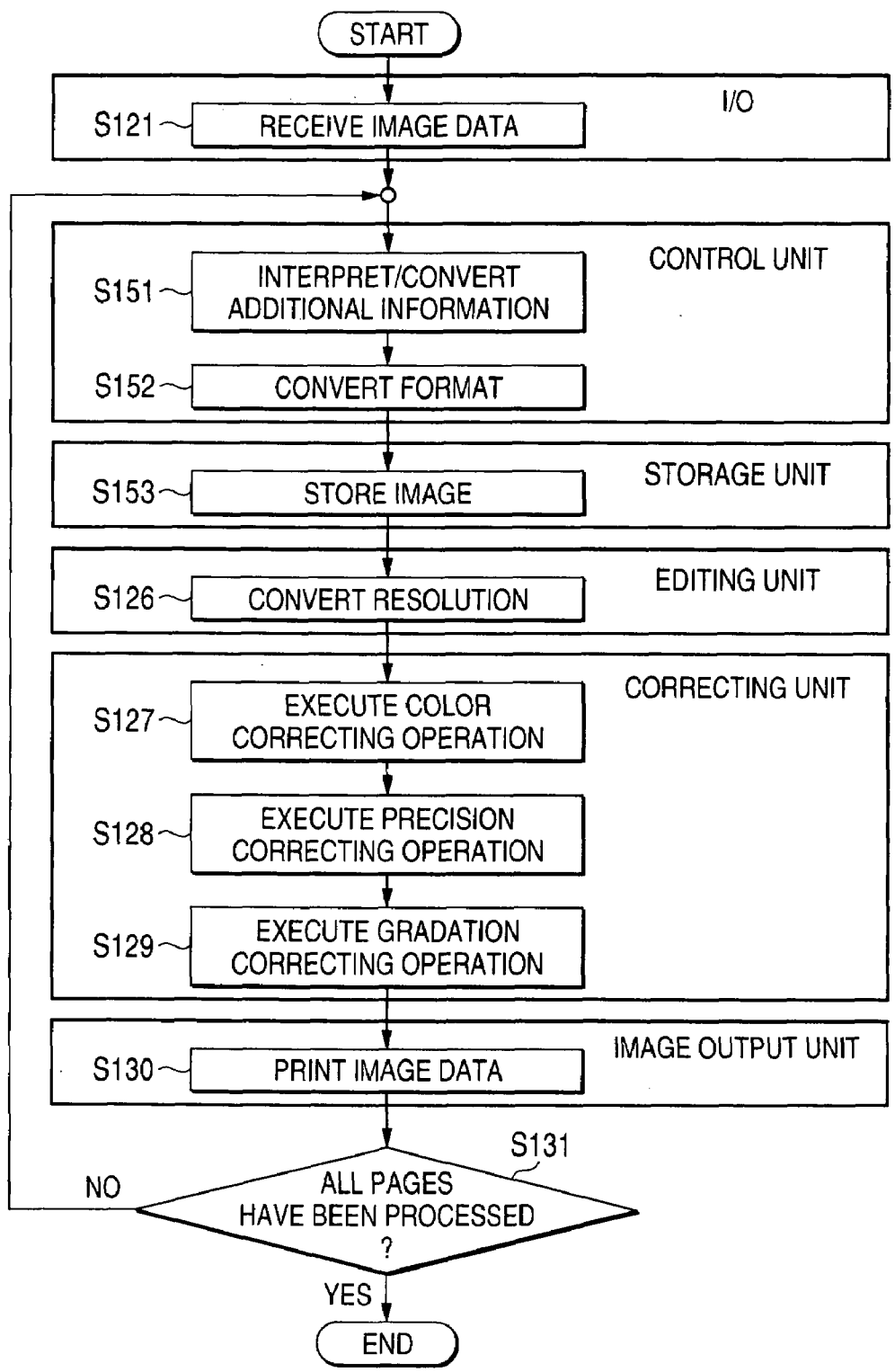
FIG. 18 is a flow chart for describing an example of operations of a reception side according to the second embodiment of the invention.

FIG. 18 is a flow chart for describing an example of operations of the image processing apparatus provided on the reception side according to the second embodiment of the present invention. In this drawing, it should be noted that the same reference numerals shown in FIG. 13 will be employed as those for denoting similar processing operations in this flow chart. First, in a first step S121, this image processing apparatus provided on the reception side receives such an image data which is transmitted via the I/O 28 and temporarily stores the received image data into the RAM employed in the control unit 26. The control unit 26 firstly extracts from the received image data having a predetermined format, document information indicative of a total page number, a total print quantity, a designation of paper, a double-face prints, designation/non-designation of an "N-up" original, and so on. Next, in a step S153, the control unit 26 interprets additional information in the unit of each page so as to extract resolution and a color mode of an output image, and also extract a sort of an original, and then, this control unit 26 sets process conditions in the editing unit 24 and the correcting unit 23 (will be explained later). Subsequently, in a step S152, the control unit 26 expands the reduced image data, and also, extracts Tag information which has been added to the transmission data in correspondence with the image data. Both the extracted image data and the extracted Tag information are transmitted via the system bus 29 into the storage unit 25, and is stored into the storage unit 25 in a step S153. Since process operations after this process operation of the step S153 are similar to those of the above-described first embodiment, descriptions thereof are omitted.

As previously explained, since the attribute information in the unit of the pixel, corresponding to the "N-up" image data, is added to the transmission data, the "network copy" having the similar image quality to that of the "direct copy" can be produced. Also, since the attribute information in the unit of the pixel is transmitted in the above-described image processing apparatus of the second embodiment, the structural scale of the image processing units provided on the reception side can be decreased. As a consequence, for example, producibility of broadcast communications for transmitting image data to a plurality of output apparatus can be improved.

It should also be noted that in the above-described explanation of the second embodiment, the Tag information is produced after the image data has been read out from the storage unit 15. The present invention is not limited to this example. Alternatively, the Tag information may be produced before the image data is stored into the storage unit 15, and the Tag information may be stored into the storage unit 15 in combination with the image data. For instance, in such a case that a mode and a sort of an original image are investigated when such a process operation as an image quality adjustment is carried out in the editing unit 14 and the like, the Tag information may be produced at this time. Also, in the case that the image processing apparatus owns a function capable of automatically judging a mode and a sort of an original image by referring to, for example, the respective pixels contained in the original image, the Tag information may be produced during this judging operation, and the produced Tag information may be transmitted to the reception side in combination with the image data. It should also be understood that in a case that the Tag information is produced before the image data is stored in the storage unit 15, when the "N-up" process operation is carried out, a plurality of Tag information may be placed side by side in a similar manner to that of the "N-up" process operation for the image data, and then, these plural sets of Tag information may be synthesized.

Next, an image processing apparatus according to a third embodiment of the present invention will now be described. In this third embodiment, a compressing process operation of image data is carried out by employing the MRC (Mixed Raster Content) system corresponding to one of the international standard compression systems designed for color facsimile machines. As a consequence, in this third embodiment, both an arrangement of the image processing apparatus provided on the transmission side and an arrangement thereof provided on the reception side are similar to those of the first embodiment shown in FIG. 1 and FIG. 12. Also, as to processing operations of this second embodiment, since process flow operations other than format converting operations (step S110 of FIG. 2) are similar to the above-described operations of the image processing apparatus provided on both the transmission side and the reception side in the first embodiment shown in FIG. 2 and FIG. 13, explanations thereof are omitted.

Figure 19:
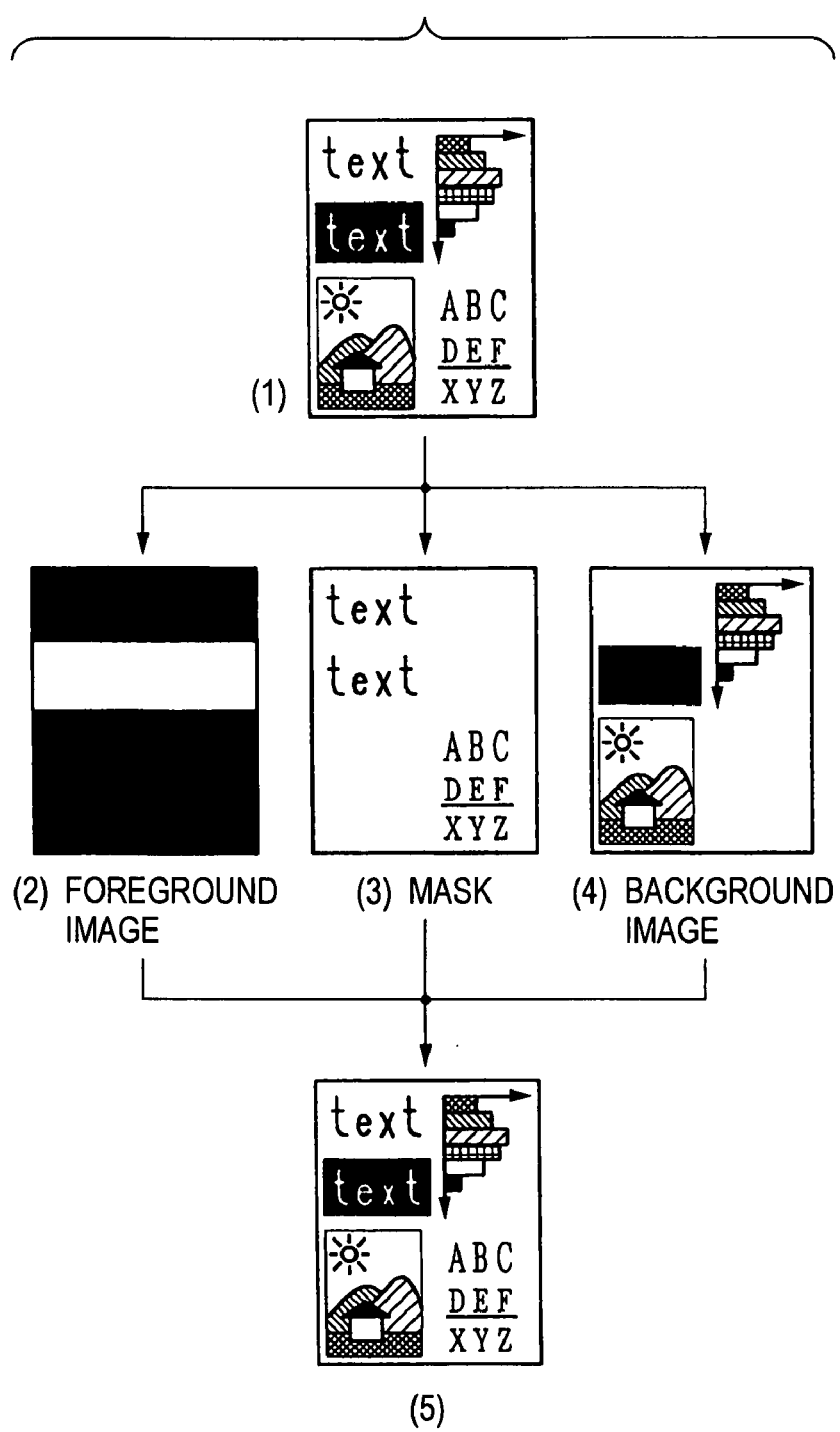
FIG. 19 is an explanatory diagram for schematically explaining the MRC compression system.

The MRC system corresponds to such a system that while an image is separated into a plurality of layers, compressing methods different from each other are applied to the respective layers, and is a superior compression system capable of compressing in a higher grade such an image which is constructed of a plurality of objects having different characteristics such as characters and pictorial patterns. FIG. 19 is an explanatory diagram for illustratively showing the MRC compression system. FIG. 19(1) illustratively indicates an original image to be compression-processed. In this case, the original to be compression-processed is constructed of objects having different characteristics such as a character, a pictorial pattern, and a graph. In the MRC compression system, such an original image is separated into three layers, namely, a foreground image indicated in FIG. 19(2), a mask shown in FIG. 19(3), and a background image represented in FIG. 19(4). In this case, both the foreground image and the background image correspond to color layers having 24 bits per 1 pixel, and the mask corresponds to a binary layer having 1 bit per 1 pixel. As indicated in FIG. 19, the background image is such a color layer which is constituted by an object whose gradation characteristic is important, such as a pictorial pattern and a photograph. Also, the mask is such a binary layer which is constituted by an object whose resolution information is important, such as a text and a line segment. The foreground image is such a layer which indicates color information of a binary image represented by the mask. As a result, while referring to the spatial information of the mask, as indicated in FIG. 19(5), one image may be reproduced from the three layers in such a manner that as to pixels in which bits of the mask are "OFF", the pixel value of the background image is left, and also, pixels in which bits of the mask are ON are replaced by the pixel values of the forward image.

As previously explained, the original having a plurality of objects is separated into the background image whose gradation has a top priory, the binary mask whose resolution has a top priority, and also the foreground image containing only the color information. For instance, since the JPEG compression operation is carried out with respect to the background image; the MMR compression operation is carried out with respect to the mask; and the JBIG compression operation is carried out with respect to the forward image, namely, since the compressing process operations suitable for the respective characteristics are carried out, the image data having a small amount of data can be obtained in a high grade.

Figure 20:
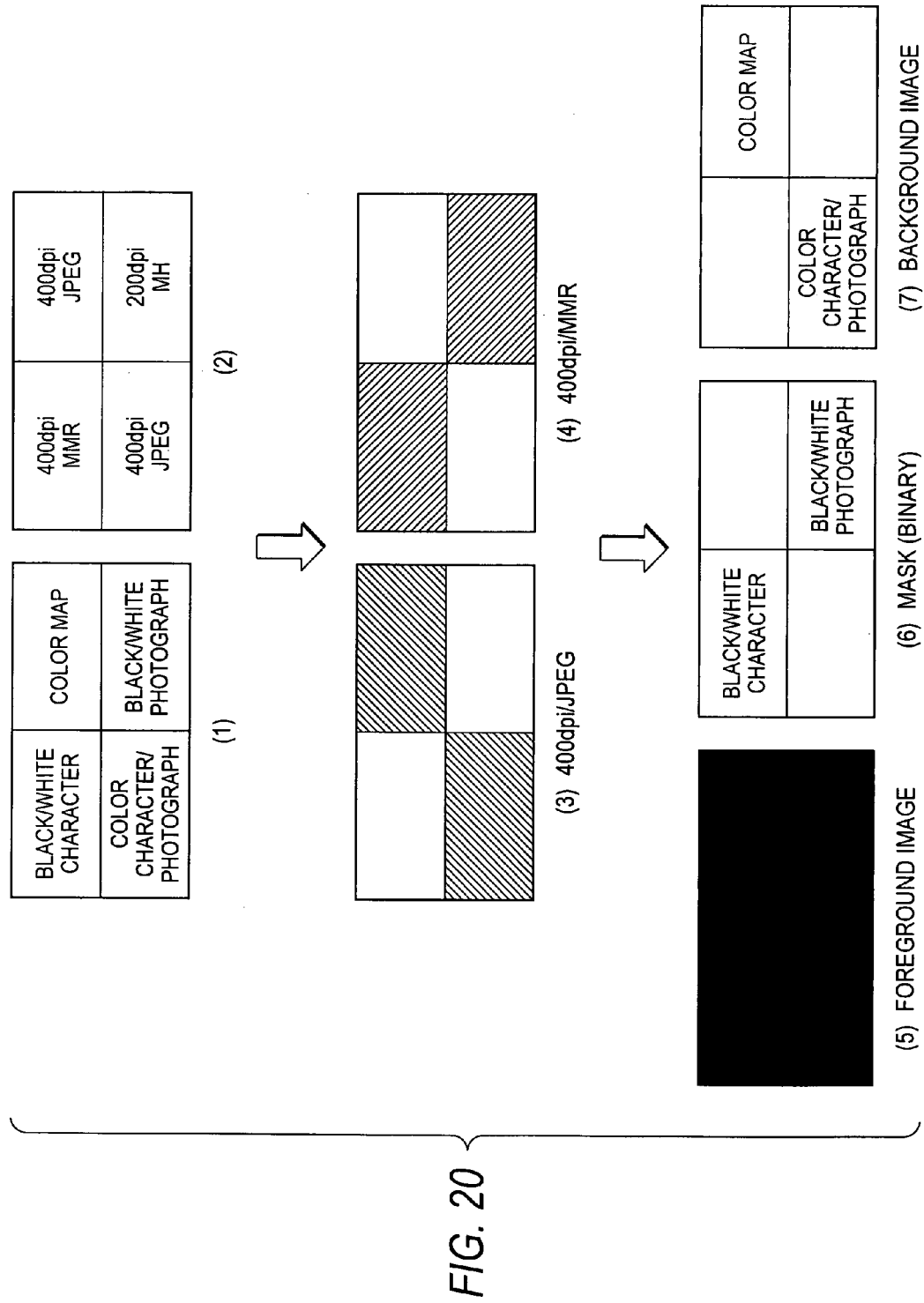
FIG. 20 is an explanatory diagram for explaining an example in which the MRC compression system is applied to the "N-up" function in a third embodiment of the present invention.

FIG. 20 is an explanatory diagram for explaining an example in which the MRC system is applied to the "N-up" function in this third embodiment of the present invention. In this drawing, FIG. 20(1) shows an "N-up" original which it to be processed, namely which is stored in the storage unit 15. As shown in FIG. 20(1), it is so assumed that a "4-up" image is produced from 4 sheets of original images, namely, a "black/white character", a "color map", a "color character/ photograph", and a "black/white photograph". FIG. 20(2) represents both resolution and a compression system, which are optimum to these four original images. This corresponds to both the resolution and the compression system, which are obtained from, for example, both the mode and the sort of the original shown in FIG. 6. As apparent from FIG. 20(2), the optimum compression methods are largely different from each other as to the four original images which are synthesized by executing the "4-up" process operation. However, as indicated by hatching images in FIG. 20(3) and FIG. 20(4), the "4-up" original images to be synthesized are subdivided into two regions, namely, a region which should be processed as a color image, and another region which should be processed as a binary white/black image. As a consequence, as indicated in FIG. 20(5) to FIG. 20(7), while both the "color map" original and the "color character/ photograph" original are allocated to the background image; both the "black/white character" original and the "black/ white photograph" original are converted into binary data which is allocated to the mask; and also, both the color of "black/white character" original and the color of "black/ white photograph" original, namely the "black" color are allocated to the foreground image, the "N-up" synthesized image shown in FIG. 20(1) is subdivided into three layers. Thereafter, the JBIG compression method is carried out with respect to the foreground image, the MMR compression method is carried out with respect to the mask, and the JPEG compression method is carried out with respect to the background image, and then, the processed images are transmitted to the network.

In the image processing apparatus provided on the reception side, such a Tag information as indicated in FIG. 14 and FIG. 15 is produced based upon the features of the respective layers as represented in FIG. 20(5), FIG. 20(6), and FIG. 20(7). Then, either the editing process operation or the correcting process operation may be executed. Both the editing process operation and the correcting process operation may be carried out while these original images are separated into the respective layers. Alternatively, after either the foreground image or the background image is selected in accordance with the mask and then these background/foreground images are synthesized with each other, either the editing process operation or the correcting process operation may be carried out every region in accordance with the Tag information.

As previously explained, the image synthesized by way of the "N-up" function using the MRC system is separated into the plural layers in response to the attributes of the images to be synthesized with each other, and then, the separated layers are transferred. As a result, the process operations can be carried out in response to the attributes of the original images even in the image processing apparatus provided on the reception side. As a consequence, even when the "network copy" is produced, the "N-up" function equivalent to that of the "direct copy" can be realized.

Next, an image processing apparatus according to a fourth embodiment of the present invention will now be described. This fourth embodiment represents such a case that an image synthesizing process operation of "N-up" function is carried out by an image processing apparatus provided on the reception side. It should be noted that since an arrangement of an image processing apparatus provided on the transmission side is similar to that of the first embodiment shown in FIG. 1, this arrangement is not shown and explanations thereof are omitted.

Figure 21:
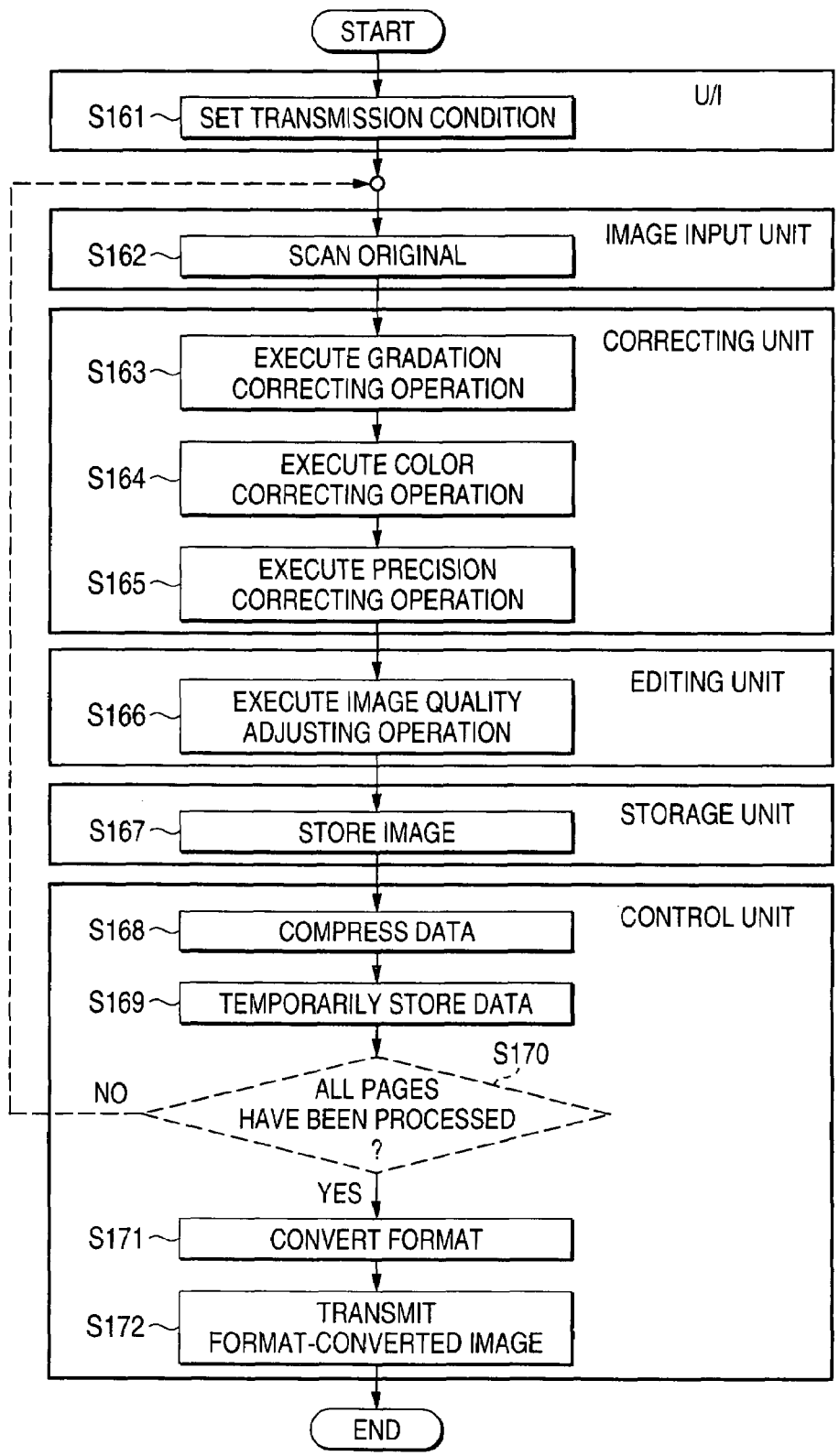
FIG. 21 is a flow chart for explaining an example of operations of a transmission side according to a fourth embodiment of the invention.

FIG. 21 is a flow chart for describing an example of operations of the image processing apparatus provided on the transmission side according to the fourth embodiment of the present invention. First, in a step S161, various setting operations of process operations related to a sort of an original and a mode of this original, and also various setting operations of information of an external device to which image data is transmitted are carried out by the U/I 17. Also, in this step, a content of an "N-up" process operation is set. Concretely speaking, such a condition that the "N-up" synthesizing operation is carried out by employing how many sheets of originals is set by the U/I 17. Also, such a condition that as indicated in FIG. 11, how to place the originals side by side with each other is set by the U/I 17. Subsequently, the image input unit 17 executes a reading operation of images formed on the set originals in a step S162. As to an RGB-color digital image signal read by the image input unit 11, various sorts of correcting process operations by the known manners such as the gradation correcting operation, the color correcting operation, and the precision correcting operation are carried out from a step S163 to a step S165 by the correcting unit 13 employed in the image processing unit 12. Subsequently, after the adjusting process operation of the image quality has been executed in a step S166 by the editing unit 14, the processed color image data is stored into the storage unit 15 in a step S167.

The image data stored in the storage unit 15 is reduced every one page thereof by the control unit 16 in a step S168, and then, the reduced image data is temporarily stored into a RAM provided in the control unit 16 in combination with the mode and the sort of the original set from the U/I 17 in a step S169. As previously described, in this fourth embodiment, the "N-up" synthesizing process operation is executed in the image processing apparatus provided on the reception side. Concretely speaking, both the reducing process operations of the original images and the arranging process operation based on a desirable layout are carried out in this image processing apparatus provided on the reception side. In general, it is preferable to execute a magnification changing operation with respect to a multi-value image. In this case, even when an original is a black/white image, it is desirable that this black/white image is handled as a gray scale image without executing the binarization processing operation, and then, the gray scale image is reduced. When it is taken into account that original image data is reduced by the image processing apparatus provided on the reception side, it becomes redundant that a reducing process operation is carried out with maintaining the same image quality as that of the normal network copy in which the "N-up" editing operation is not performed. When the "N-up" function is realized, the reducing process operation is preferably performed based upon a parameter by which a high reducing ratio is obtained in response to a value of "N" in view of producibility.

After the reduced image data has been temporarily stored in the RAM of the control unit 16, the storage medium is initialized and thus, the storage unit 15 is prepared for storing thereinto image data of a next original. Alternatively, as explained above, the image data reduced in the control unit 16 may be again stored into the storage unit 15.

In a step S170, the control unit 16 judges as to whether or not the processing operation for all of the pages is accomplished. When such an original which has not yet been read is still left, the process operation is returned to the previous step S162 in which the above-described process operations are repeatedly carried out.

After the scanning/correcting/editing operations and also the storing operation into the control unit 16 have been accomplished as to all of these originals, the all image data is converted into image data having a preselected format for transmission purposes in a step S171 by the control unit 16. The image data format for transmission purposes maybe arbitrarily determined. In this case, as one of image formats, the TIFF format is employed in a similar manner to that of the first embodiment. In this example, for instance, five pieces of the below-mentioned information is added to a TIFF file as private data capable of realizing the "N-up" function:

(a) Information used to indicate that a plurality of originals are synthesized with each other from image data so as to produce an "N-up" image;

(b) information indicative of total number of originals employed in an "N-up" synthesizing operation;

(c) information indicative of total number of originals which are arranged along both a main scanning direction and a sub-scanning direction;

(d) information representative of an arranging sequence of originals and an arrangement of these originals; and (e) information indicative of attributes of the respective original images.

As explained above, the data for the transmission purposes which is produced in the control unit 16 is transmitted via the system bus 19 and the I/O 18 to the network in a step S172.

Figure 22:
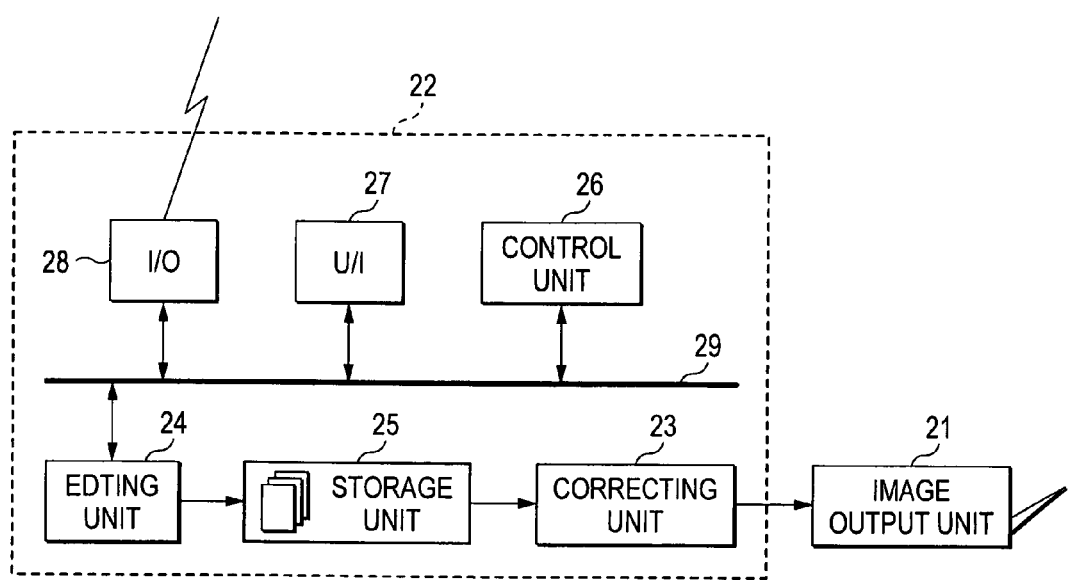
FIG. 22 is a block diagram for indicating a configuration of a reception side according to the fourth embodiment of the invention.

FIG. 22 is a block diagram for schematically showing an arrangement of an image processing apparatus provided on the reception side according to the fourth embodiment of the present invention. It should be noted that the same reference numerals shown in FIG. 12 will be employed as those for denoting the same, or similar structural units of FIG. 22. In this fourth embodiment, since the "N-up" synthesizing operation is carried out on the reception side, a storage unit 25 is arranged at a post stage of an editing unit 24. Other structural units of this fourth embodiment are similar to those of the above-described first embodiment.

Figure 23:
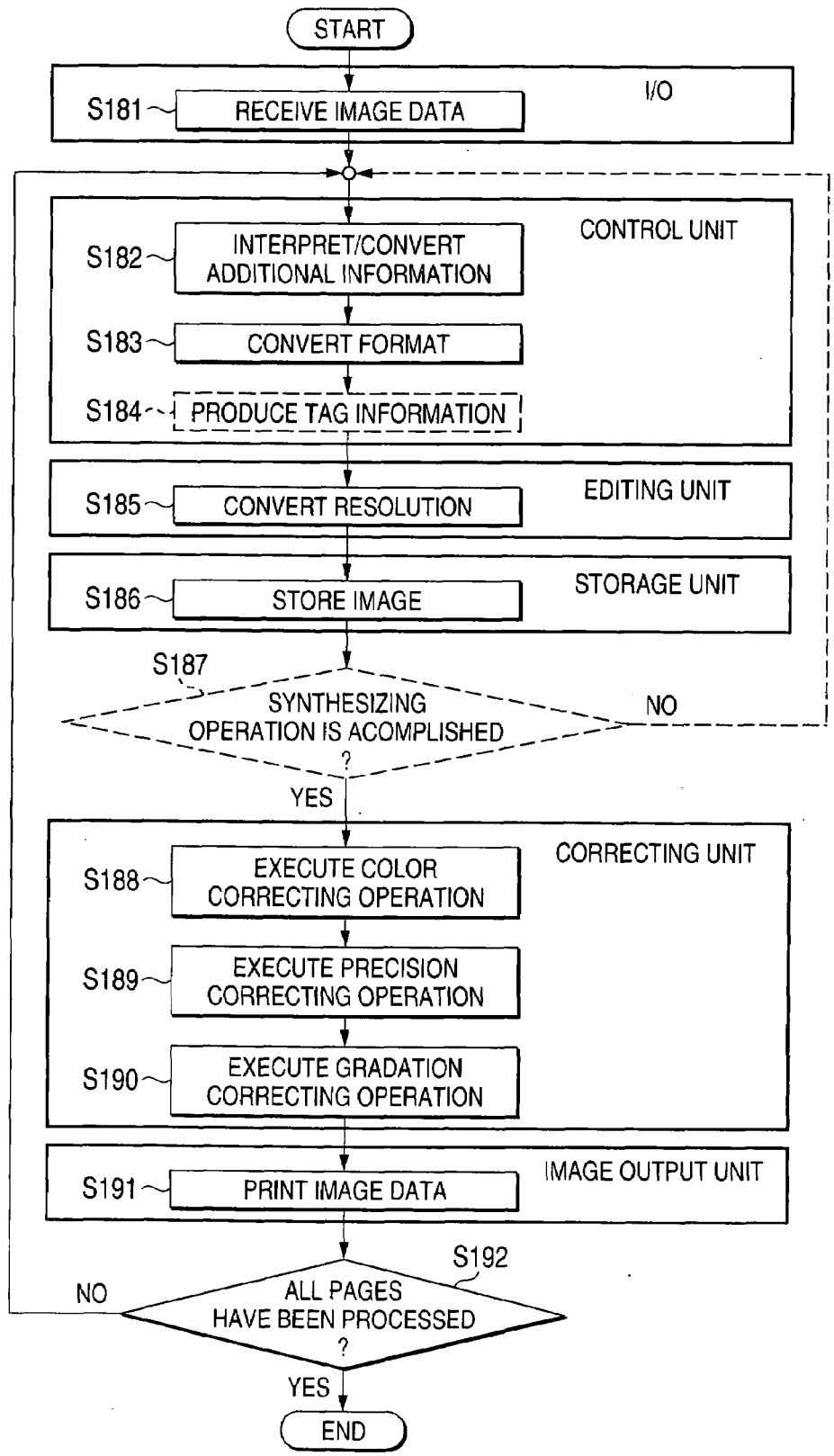
FIG. 23 is a flow chart for describing an example of operations of the reception side according to the fourth embodiment of the present invention.

FIG. 23 is a flow chart for describing an example of operations of the image processing apparatus provided on the reception side according to the fourth embodiment of the present invention. In this flow operation, in a first step S181, this image processing apparatus provided on the reception side receives such an image data which is transmitted via the I/O 28 from the image processing apparatus provided on the transmission side shown in FIG. 1, and temporarily stores the received image data into the RAM employed in the control unit 26. The control unit 26 firstly extracts from the received image data having a predetermined format, document information indicative of a total page number, a total print quantity, a designation of paper, a double-face print, designation/non-designation of an "N-up" original, and so on. Next, in a step S182, the control unit 26 interprets additional information such as an attribute in the unit of each page. Subsequently, in a step S183, the control unit 26 executes an expanding process operation as to the reduced image data, and transfers the expanded image data via the system bus 29 to the editing unit 24.

In the editing unit 24, a resolution converting process operation is carried out in a step S185. As the resolution converting operation executed in this case, the editing unit 24 executes a magnification changing process operation and a reducing process operation. The magnification changing process operation makes resolution of the received image coincident with the resolution of the image output unit 21. The reducing process operation is to execute the "N-up" synthesizing operation. The image to which the magnification changing operation has been executed is entered into the storage unit 25, and then, is stored into this storage unit 25 at a preselected coordinate value/direction based upon a layout designated by the additional information in a step S186.

Also, in a step S184, the control unit 26 produces Tag information having such a size corresponding to the image data whose resolution has been converted from the information related to the mode and the sort in the unit of the page, which are extracted in the step S182. The control unit 26 stores the produced Tag information at a coordinate value corresponding to the storage position of the image data stored in the storage unit 25. The Tag information is similar to that of the above-described respective embodiments. Alternatively, the control unit 26 produces Tag information having a size equal to that of the image data in the step S184. Then, the editing unit 24 may execute the resolution converting process operation with respect to the Tag information in combination with the image data, and the control unit 26 may store the resolution-converted Tag information at a coordinate value corresponding to the storage position of the image data of the storage unit 25.

In a step S187, the control unit 26 judges as to whether or not the "N-up" synthesizing operation is accomplished. In other words, the control unit 26 judges as to whether or not the above-described process operations have been carried out with respect to "N" sheets of images. If an unprocessed image is left in "N" sheets of these images, then the process operation is returned to the previous step S182 in which similar process operations are carried out with respect to this unprocessed image. As previously explained, since the above-described process operation is repeatedly carried out with respect to the images which should be processed by the "N-up" synthesizing operation, both the "N-up" synthesizing image and the Tag information corresponding to this "N-up" synthesizing image are produced in the storage unit 25. It should be noted that while there is no "N" sheets of images, when the received image is ended, it is so regarded that the "N-up" synthesizing operation is accomplished at this time instant.

In the produced "N-up" synthesized image, the Tag information similarly produced in correspondence with this "N-up" synthesized image is present. While referring to these image and information, the correcting unit 23 executes a color correcting process operation in a step S188, a precision correcting process operation in a step S189, and a gradation correcting process operation in a step S190. The image output unit 21 produces an image-formable YMCK image signal. It should be noted that contents of the respective process operations are similar to those of the above-described first embodiment. The YMCK images signal which has been processed in this manner is supplied to the image output unit 21. In a step S191, an image is formed in the image output unit 21.

In a step S192, the control unit 26 judges as to whether or not images of all of the designated page numbers have been processed. In the case that the total processed page number is not yet reached to the designated page number, the process operation is returned to the step S182 in which the above-described process operations are repeatedly carried out. Since the above-explained process operations are repeatedly carried out plural times equal to the designated page number of the received image, the forming process operation of the received image may be realized.

In this fourth embodiment, since the information indicative of the attributes as to the respective images which are "N-up"-synthesized with each other is transmitted from the transmission side, the process operations can be carried out with respect to the "N-up"-synthesized image in response to the attribute thereof. As a result, even when the "N-up" function is employed, the "network copy" having a similar image quality to that of the "direct copy" may be produced. Also, since the magnification changing process operation (resolution converting process operation) is carried out on the reception side, the image having the higher image quality can be formed, as compared with the image quality obtained in the case that the magnification changing process operations are carried out on the transmission side and the reception side as explained in the first embodiment.

In the above-explained arrangement and operation of the image processing apparatus provided on the reception side in the fourth embodiment, the editing unit 24 executes the resolution converting operation and the synthesizing operation based upon the "N-up" function, and thereafter, the correcting unit 23 executes various sorts of correcting process operations with employment of the Tag information. However, the present invention is not limited to the above-explained operations, but may be applied to another process operation. That is, for instance, after the editing unit 24 has performed the resolution converting operation, the correcting unit 23 may execute various sorts of correcting process operations with employment of the Tag information, and thereafter, the editing unit 24 may execute the synthesizing operation based upon the "N-up" function. Also, after the correcting unit 23 has executed various sorts of correcting process operations with employment of the Tag information, the editing unit 24 may execute the resolution converting operation and the synthesizing operation based upon the "N-up" function. In particular, in the case that the resolution of the image output unit 21 is high, the highspeed process operations may be carried out if the correcting unit 23 executes the correcting process operation in advance. As apparent from the foregoing description, various sorts of these correcting process operations by the correcting unit 23 may be separately carried out before/after there solution converting operation executed by the editing unit 24, and before/after the image synthesizing operation based upon the "N-up" function.

Next, an image processing apparatus according to a fifth embodiment of the present invention will now be described. This fifth embodiment represents such a case that an image reducing process operation for "N-up" function is carried out by an image processing apparatus provided on the transmission, and also an image synthesizing process operation is performed by an image processing apparatus provided on the reception. It should be noted that since an arrangement provided on the transmission side is similar to that of the first embodiment shown in FIG. 1, and an arrangement provided on the reception side is similar to that of the fourth embodiment indicated in FIG. 22, these arrangements are not indicated and operations thereof are omitted.

Figure 24:
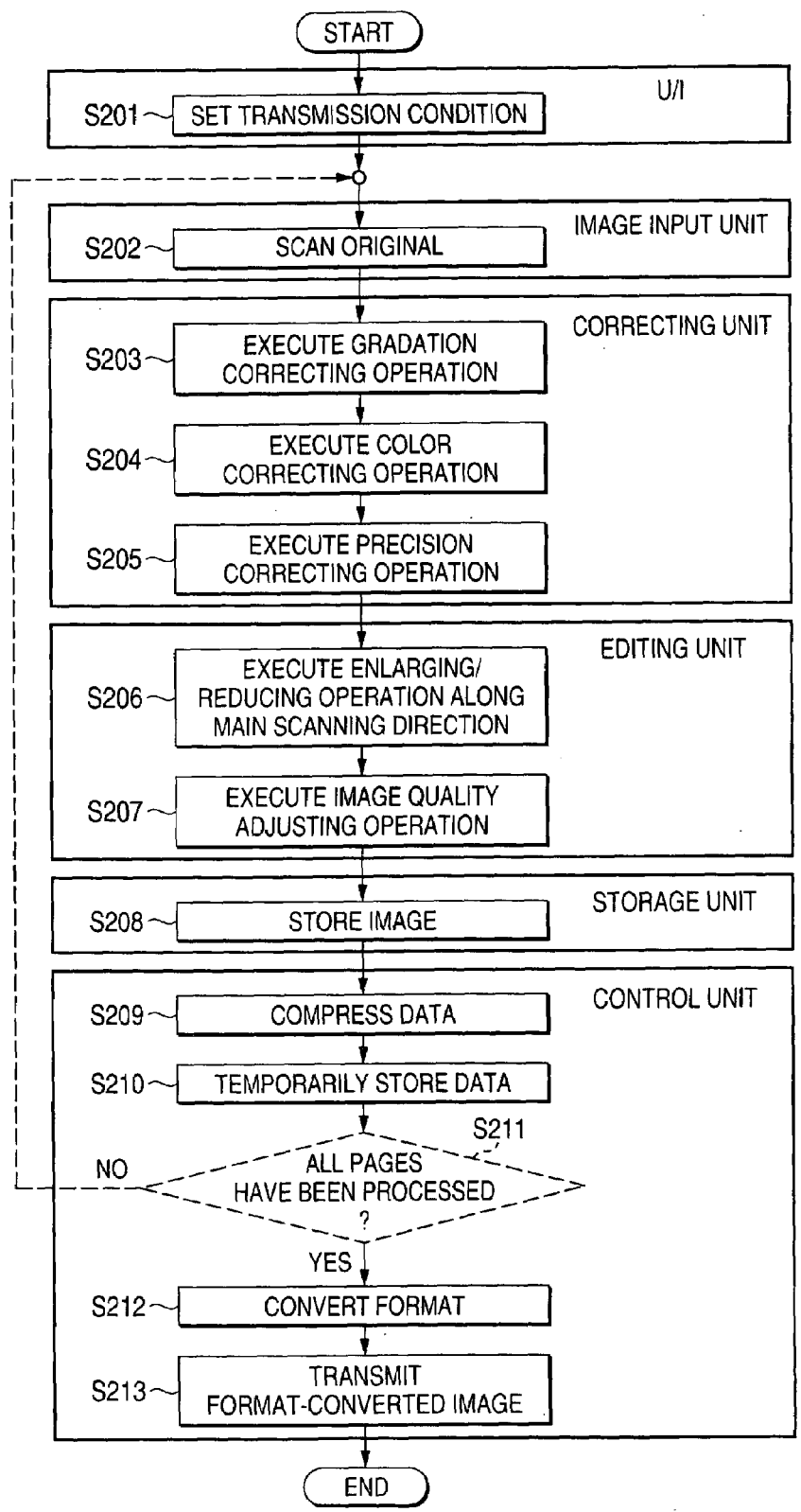
FIG. 24 is a flow chart for explaining an example of operations of the transmission side according to a fifth embodiment of the invention.
Figure 25:
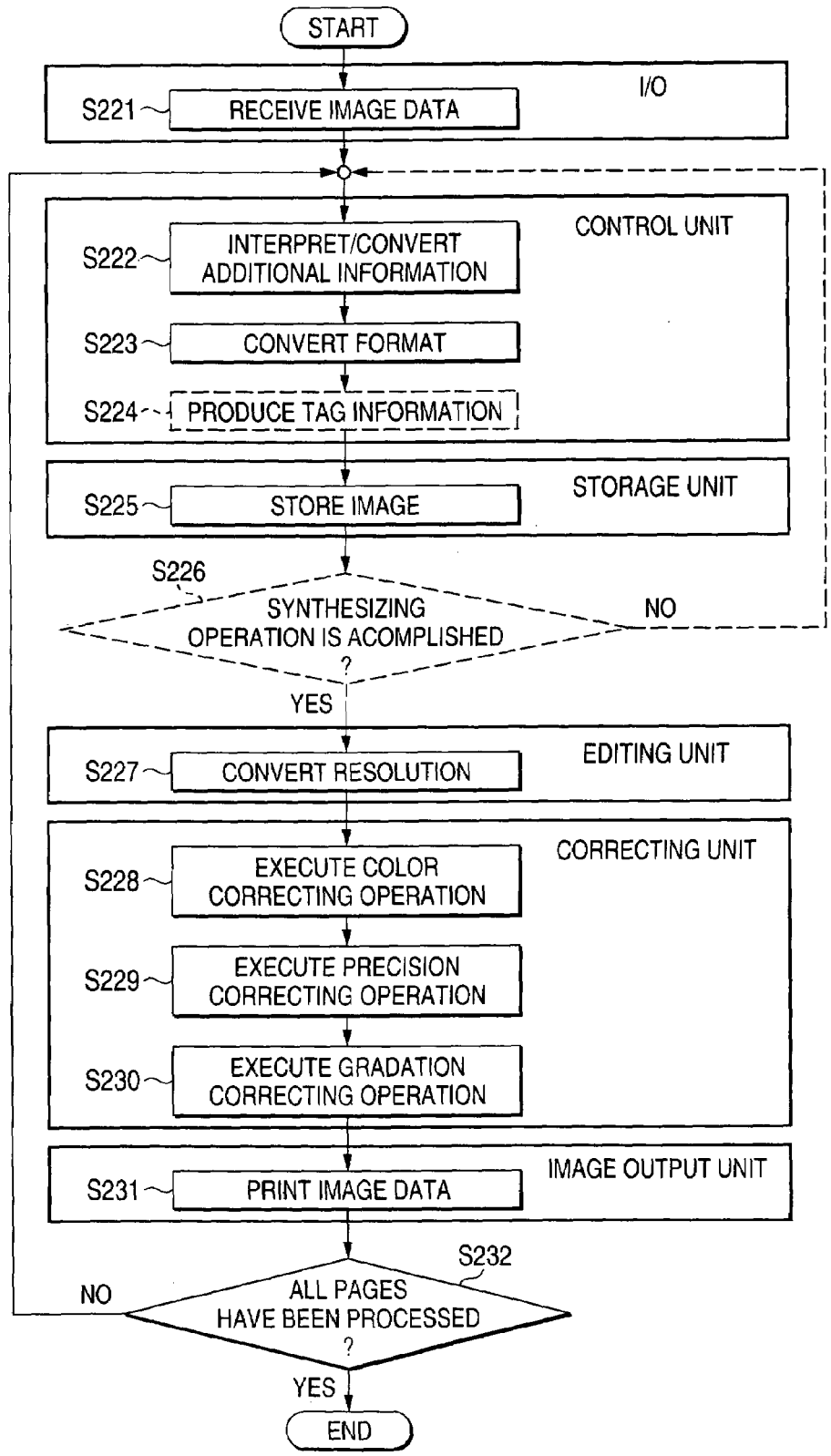
FIG. 25 is a flow chart for describing an example of operations of the reception side according to the fifth embodiment of the invention.

FIG. 24 is a flow chart for describing an example of operations of the image processing apparatus provided on the transmission side according to the fifth embodiment of the present invention. First, in a step S201, various setting operations of process operations related to a sort of an original and a mode of this original, and also information of an external device to which image data is transmitted are carried out by the U/I 17. Also, in this step, a content of an "N-up" process operation is set. Concretely speaking, such a condition that the "N-up" synthesizing operation is carried out by employing how many sheets of originals is set by the U/I 17. Also, such a condition that how to place the originals side by side with each other is set by the U/I 17. Subsequently, the image input unit 17 executes a reading operation of images formed on the set originals in a step S202. At this time, in the case that either the reducing process operation or the enlarging process operation is required, since the scanning speed is controlled in this case, the magnification processing operation can be carried out with respect to the sub-scanning direction. As to an RGB-color digital image signal entered into the image input unit 11, various sorts of correcting process operations by the known manners such as the gradation correcting operation, the color correcting operation, and the precision correcting operation are carried out from a step S203 to a step S205 by the correcting unit 13 employed in the image processing unit 12. Subsequently, after the adjusting process operation of the image quality has been executed in a step S207 and also the enlarging/reducing process operations with respect to the main scanning direction has been executed in a step S206, the resultant RGB color digital image signal is stored into the storage unit 15 in a step S208. In the case that the magnification changing process operation for the sub-scanning direction is not carried out when the image is read in the step S202, the magnification changing process operation along the sub-scanning direction may also be carried out in the step S206.

The image data stored in the storage unit 15 is reduced every one page thereof by the control unit 16 in a step S209, and then, the reduced image data is temporarily stored into a RAM provided in the control unit 16 in combination with the mode and the sort of the original set from the U/117 in a step S210. It should be noted that in this fourth embodiment, the resolution converting process operation is not executed in the image processing unit 22 provided on the reception side unless the resolution of the image input unit 11 is different from the resolution of the image output unit 21. As a consequence, as shown in FIG. 6, the image data can be reduced based upon the optimum compression systems with respect to the respective originals, depending upon an output electronic appliance of a transmission destination, so that producibility can be improved.

After the reduced image data has been temporarily stored in the RAM of the control unit 16, as explained above, the storage medium is initialized and thus, the storage unit 15 is prepared for storing thereinto image data of a next original. Alternatively, the image data reduced in the control unit 16 may be again stored into the storage unit 15.

In a step S211, the control unit 16 judges as to whether or not the processing operation for all of the pages is accomplished. When such an original which has not yet been read is still left, the process operation is returned to the previous step S202 in which the above-described process operations are repeatedly carried out. The above-explained process operations are repeatedly carried out until all of the originals which are used to execute the "N-up" synthesizing operation are accomplished.

After the scanning/correcting/editing operations and also the storing operation into the control unit 16 have been accomplished as to all of these originals, the "N-up" image data is converted into image data having a preselected format for transmission purposes in a step S212 by the control unit 16. The image data format for transmission purposes may be arbitrarily determined. In this case, as one of image formats, the TIFF format is employed in a similar manner to that of other embodiments. In this fifth embodiment, for instance, five pieces of the below-mentioned information is added to a TIFF files as private data capable of realizing the "N-up" function:

(a) Information used to indicate that a plurality of originals are synthesized with each other from image data so as to produce an "N-up" image;
(b) information indicative of a total number of originals employed in an "N-up" synthesizing operation;
(c) information indicative of a total number of originals which are arranged along both a main scanning direction and a sub-scanning direction;
(d) information representative of an arranging sequence of originals and an arrangement of these originals; and
(e) information indicative of attributes of the respective original images.

As explained above, the data for the transmission purposes which is converted in the control unit 16 is transmitted via the system bus 19 and the I/O 18 to the network in a step S213.

Figure 26:
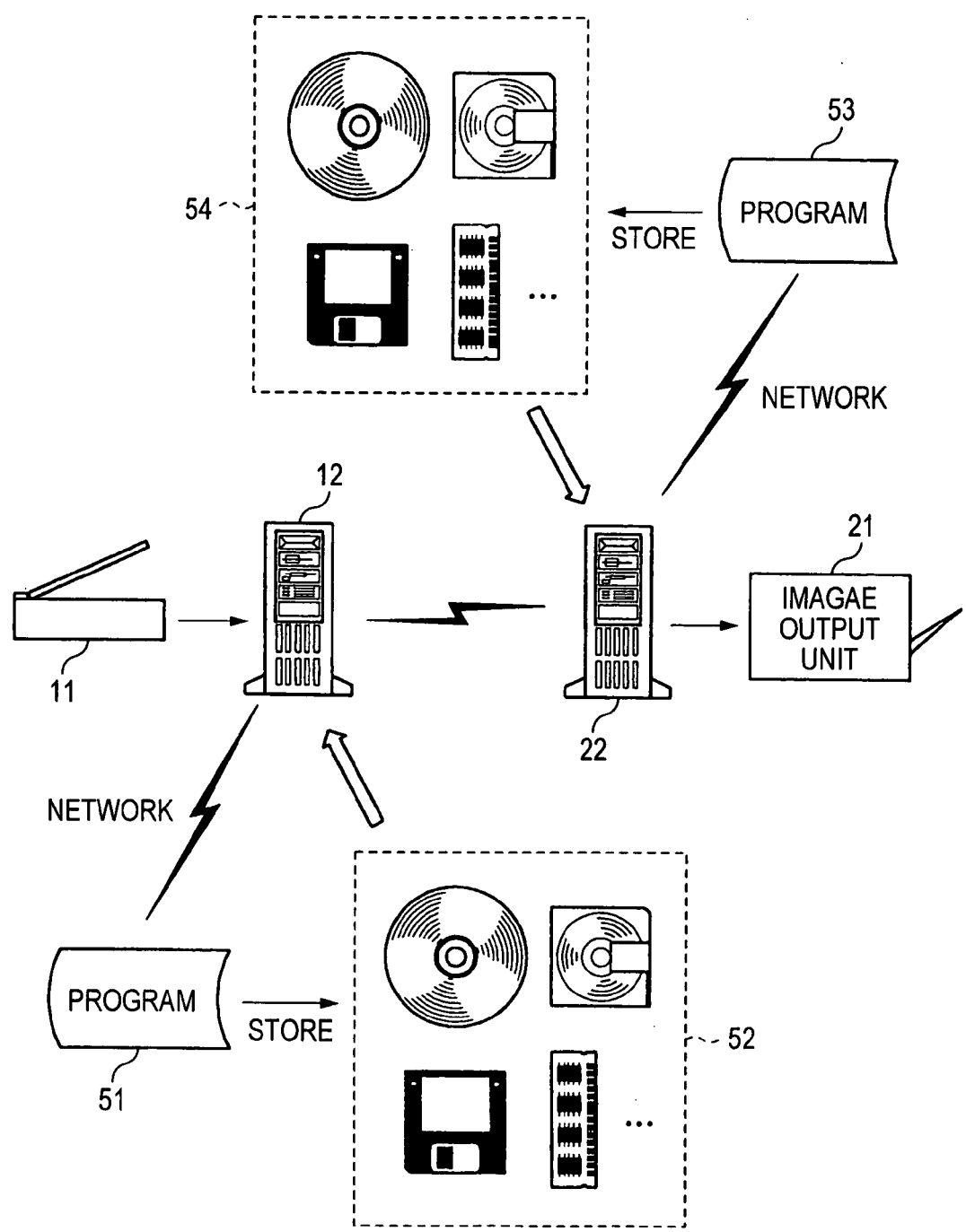
FIG. 26 is an explanatory diagram for explaining an example of both a computer program and a storage medium which stores thereinto this computer program in the case that either a function of an image processing apparatus or an image processing method, according to the invention, are realized by the computer program.
Figure 27:
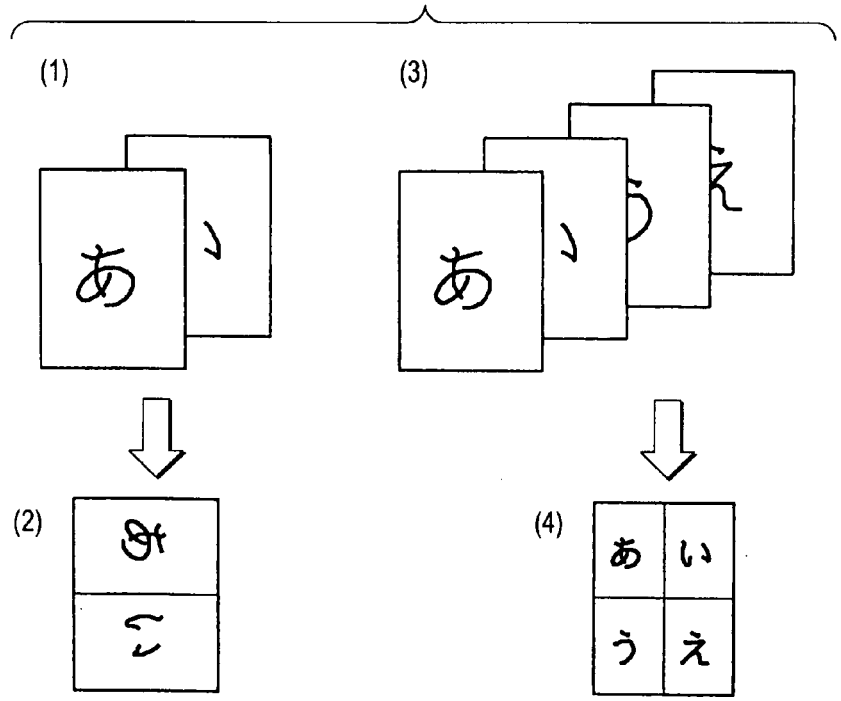
FIG. 27 is an explanatory diagram for explaining one example of such a function that a plurality of original images are placed side by side on single paper to be recorded.
Figure 28:
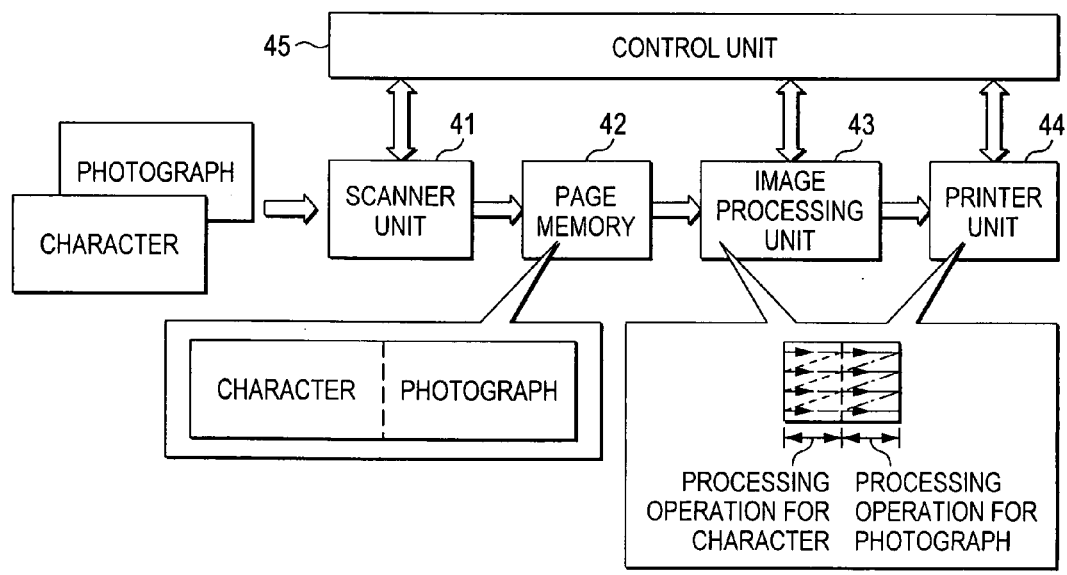
FIG. 28 is an explanatory diagram for explaining one structural example capable of realizing the "N-up" function when the "direct copy" is produced.

FIG. 26 is a flow chart for describing an example of operations of the image processing apparatus provided on the reception side according to the fifth embodiment of the present invention. In this flow operation, in a first step S221, this image processing apparatus provided on the reception side receives such an image data which is transmitted via the I/O 28 from the image processing apparatus provided on the transmission side shown in FIG. 1, and temporarily stores the received image data into the RAM employed in the control unit 26. The control unit 26 firstly extracts from the received image data having a predetermined format, document information indicative of a total page number, a total print quantity, a designation of paper, a double-face print, designation/non-designation of an "N-up" original, and so on. Next, in a step S223, the control unit 26 interprets additional information in the unit of each page. Subsequently, in a step S223, the control unit 26 executes an expanding process operation as to the reduced image data, and transfers the expanded image data via the system bus 29 to the storage unit 25. In a step S225, the expanded image data is stored into this storage unit 25 at a preselected coordinate value/direction based upon a layout designated by the additional information. Also, in a step S224, the control unit 26 produces Tag information having such a size corresponding to the image data from the information related to the mode and the sort in the unit of he page, which are extracted in the step S222. The control unit 26 stores the produced Tag information at such a coordinate value corresponding to the storage position of the image data stored in the storage unit 25. The Tag information is similar to that of the above-described respective embodiments.

In a step S226, the control unit 26 judges as to whether or not the "N-up" synthesizing operation is accomplished. In other words, the control unit 26 judges as to whether or not the above-described process operations have been carried out with respect to "N" sheets of images. If an image to be processed is lefted in "N" sheets of these images, then the process operation is returned to the previous step S222 in which similar process operations are carried out with respect to this unprocessed image. As previously explained, since the above-described process operation is repeatedly carried out with respect to the images which should be processed by the "N-up" synthesizing operation, both the "N-up" synthesizing image and the Tag information corresponding to this "N-up" synthesizing image are produced in the storage unit 25. It should be noted that while there is no "N" sheets of images, when the received image is ended, it is so regarded that the "N-up" synthesizing operation is accomplished at this time instant.

The produced Tag information is defined in correspondence with the "N-up" synthesized image. Both the "N-up" synthesized image and the Tag information are entered into the editing unit 24, and then, the resolution converting process operation is carried out in a step S227 in order that resolution of the transmitted image data is made coincident with the resolution of the image output unit 21. Apparently, when the resolution of the transmitted image data is made coincident with the resolution of the image output unit 21, the above-explained resolution converting process operation of the step S227 is no longer required.

With respect to the synthesized image, the correcting unit 23 furthermore executes a color correcting process operation in a step S228, a precision correcting process operation in a step S229, and a gradation correcting process operation in a step S230. The image output unit 21 produces an image-formable YMCK image signal. These process operations are carried out in such a manner that optimum process operations may be executed to the respective regions with reference to the Tag information signal corresponding to the synthesized image. The YMCK image signal which has been processed in this manner is supplied to the image output unit 21. In a step S231, an image is formed in the image output unit 21.

In a step S232, the control unit 26 judges as to whether or not images of all of the designated page numbers have been processed. In the case that the total processed page number is not yet reached to the designated page number, the process operation is returned to the step S222 in which the above-described process operations are repeatedly carried out. Since the above-explained process operations are repeatedly carried out plural times equal to the designated page number of the received image, the forming process operation of the received image may be realized.

In this fifth embodiment, since the attribute information corresponding to the respective images after being processed by the magnification changing process operation is transmitted from the image processing apparatus provided on the transmission side, the process operations may be carried out with respect to the "N-up" synthesized image in response to the attribute information thereof. As a consequence, even when the "N-up" function is employed, such a "network copy" having a similar image quality to that of the "direct copy" may be obtained. Also, since the magnification changing process operation is carried out on the transmission side, a transfer efficiency when the image is transmitted from the transmission side to the reception side may be improved, as compared with the above-explained fourth embodiment.

In this fifth embodiment, in such a case that the image processing apparatus provided on the reception side owns a mechanism capable of judging an attribute of an image, the attribute information of the respective images need not be transmitted from the image processing apparatus provided on the transmission side. Also, in this case, since the image processing apparatus provided on the reception side can judge the attribute every image and can utilize the judged attribute in the synthesized image, the "N-up" function can be realized in a higher image quality.

Also, in accordance with the arrangement and the operations of the image processing apparatus provided on the reception side in the above-described first to third embodiments and fifth embodiment, after the image synthesizing operation has been performed based upon the "N-up" function, various sorts of correcting process operations are carried out by employing the Tag information by the correcting unit 23. However, the present invention is not limited to the above-explained arrangement/operations, but may be applied to such a case that, for instance, after various sorts of correcting process operations have been carried out in advance with employment of the Tag information by the correcting unit 23, the image synthesizing operation may be carried out based upon the "N-up" function. Similarly, the resolution converting process operation may be carried out by the editing unit 24 before the image synthesizing operation is executed based upon the "N-up" function.

Furthermore, in each of the above-described embodiments, the following description has been made. That is, the black/white binary value/gray scale/RGB have been employed as the color space when the image is transmitted/received; the MH/MMR/JPEG systems and the like have been used as the compression system; and the TIFF has been employed as the image format in the first, second, fourth, and fifth embodiments. The present invention is not especially limited to these items, but may employ an arbitrary color space, an arbitrary compression system, and an arbitrary image format. Similarly, the description has been made in which both the color mode and the sort of the original have been employed as the attribute of the original. For instance, other attributes may be used, namely such an information as to whether an original corresponds to a printed photograph, or a printed matter may be used as the attribute of the original; and such an information related to a background of an original and also to a backing copy may be used as the attribute of the original. Furthermore, such an embodiment has been described in which these attributes are entered from either the U/I 17 or the U/I 27. Alternatively, either in the image processing unit 12 provided on the transmission side or the image processing unit 22 provided on the reception side, for instance, while a processing means for judging as to whether an original corresponds to a black/white image, or a color image is conducted, this judging result may be combined with attribute information to be added. Also, in the above-described first embodiment to third embodiment and fifth embodiment, when the magnification changing process operation is carried out in the image processing apparatus provided on the transmission side, the magnification changing process operations may be separately carried out as to the sub-scanning direction and the main scanning direction by the image input unit 11 and the editing unit 14. Alternatively, the magnification changing process operations maybe carried out by the editing unit 14 as to both the main scanning direction and the sub-scanning direction.

Furthermore, in each of the above-described embodiments, such a case has been described. That is, while both the image processing apparatus provided on the transmission side and the image processing apparatus provided on the reception side are represented, the communication is established between these image processing apparatus. The present invention is no limited to this case, but may be applied to another case that, for example, the image input unit 11 maybe realized by a network scanner connected to a network, and this network scanner may be separately provided with the image processing unit 11. Similarly, for example, the image output unit 21 may be realized by a network printer connected to a network, and this network printer may be separately provided with the image processing unit 22. In addition, such a combination between the network scanner and the network printer may be employed.

FIG. 26 is an explanatory diagram for explaining one example of a computer program and a storage medium for storing thereinto this computer program in such a case that either a function of an image processing apparatus or an image processing method of the present invention is realized by such a computer program. In this drawing, reference numerals 51 and 53 are programs, and reference numerals 52 and 54 show recording media. It should be understood that both the function of the image processing unit 11 of the image processing apparatus provided on the transmission side, and the function of the image processing unit 12 of the image processing apparatus provided on the reception side may also be realized by way of a computer program. For example, in the image processing apparatus provided on the transmission side shown in FIG. 1, while the RAM of the control unit 16 is commonly used as the storage unit 51, both the functions of the correcting unit 13 and the editing unit 14, and also the function executed in the control unit 16 are realized as the program 51, and then, this program 51 may be executed by the CPU of the control unit 16. Also, for instance, in the image processing apparatus provided on the reception side shown in FIG. 12 and FIG. 22, while the RAM of the control unit 26 is commonly used as the storage unit 25, both the functions of the correcting unit 23 and the editing unit 24, and also the function executed in the control unit 26 are realized as the program 53, and then, this program 53 may be executed by the CPU of the control unit 26.

In such a structural case, this program 51, the program 53, and data used by these programs 51/53 may be stored in computer-readable storage media 52 and 54. The storage media 52 and 54 correspond to such media that changed states of energy such as magnetic, optical, electric energy are conducted in response to description contents of a program, and then, the description contents of this program may be transferred in a signal format corresponding to the changed states to a reading apparatus provided in a hardware resource of a computer. For example, as the storage media, there are optical disks (CD-ROM etc.), magnetic optical disks (MO etc.), magnetic disks, magnetic cards, memories (including IC cards and memory card). Apparently, these storage media are not limited to portable type storage media.

While the programs 51 and 53 are stored in these storage media 52 and 54, since either the storage medium 52 or the storage medium 54 is mounted on a computer capable of activating, for instance, the functions of the image processing units 12 and 22, this computer can execute the various functions which are described in the respective embodiments of both the image processing apparatus and the image processing method according to the present invention. Alternatively, while the programs 51 and 53 have been previously stored into the storage media 52 and 54, and also these storage media 52 and 54 have been previously mounted on a computer capable of executing the functions of the image processing units 51 and 53, either the program 51 or the program 53 is transferred via, e.g., a network to the computer, and then, either the program 51 or the program 53 may be stored into either the storage medium 52 or the storage medium 54 so as to be executed.

As apparent from the above-explained descriptions, in accordance with the present invention, even in such an arrangement of combining a scanner with a printer in which image processing operations are separately controlled via a network, there is an effect that the "N-up" duplication function having a similar image quality to that of the "direct copy" can be realized.

What is claimed is:

1. An image processing apparatus comprising:
a reduction unit for reducing each of a plurality of input images;
an image synthesizing unit for synthesizing the plurality of images to produce a single synthesized image for N-up printing in such a manner that the plurality of images reduced by the reduction unit are placed side by side;
an attribute information producing unit for producing attribute information of the synthesized image; and
a transmission unit for transmitting the synthesized image and the attribute information to an external device.

2. The image processing apparatus according to claim 1, further comprising a conversion unit for converting the synthesized image and the attribute information into another information in a predetermined format,
wherein the transmission unit transmits the other information to the external device.

3. The image processing apparatus according to claim 2, wherein the conversion unit determines the predetermined format on a basis of the attribute information of the synthesized image.

4. The image processing apparatus according to claim 1, wherein the attribute information producing unit produces plural pieces of attribute information of regions each of which is defined in units of the corresponding reduced image before synthesized.

5. The image processing apparatus according to claim 1, wherein the attribute information producing unit produces a single piece of attribute information of the synthesized image from plural pieces of attribute information of the plurality of images to be synthesized.

6. The image processing apparatus according to claim 1, wherein the attribute information producing unit produces the attribute information of the synthesized image in the unit of a pixel of the synthesized image.

7. The image processing apparatus according to claim 1, wherein the attribute information of the synthesized image comprises:
first information indicating whether the synthesized image is a color image or a black/white image; and
second information indicating type of the synthesized image.

8. An image processing apparatus comprising:
a reception unit for receiving information from an external device, the information including a synthesized image in which a plurality of images are placed side by side to form a single synthesized image and attribute information corresponding to the synthesized image;
an information extracting unit for extracting the synthesized image and the attribute information from the information received by the reception unit;
an attribute information producing unit for producing another attribute information for every an area different from an area corresponding to the attribute information, based on the attribute information extracted by the information extracting unit; and
a correction unit for correcting the synthesized image based on the attribute information produced by the attribute information producing unit.

9. The image processing apparatus according to claim 8, wherein the attribute information producing unit produces the attribute information in which the entire synthesized image is employed as a single area from a plurality of attribute information which are added to respective small areas with respect to the synthesized image.

10. The image processing apparatus according to claim 8, wherein the attribute information producing unit produces the attribute information every one pixel from attribute information every an area constituted by a plurality of pixels extracted by the information extracting unit.

11. An image processing apparatus comprising:
a reduction unit for reducing each of a plurality of input images;
an image synthesizing unit for placing the plurality of images reduced by the reduction unit side by side to synthesize the plurality of images to form a single synthesized image for N-up printing every an attribute of the image; and
a transmission unit for transmitting the plurality of synthesized images to an external device.

12. The image processing apparatus according to claim 11, further comprising a conversion unit for converting the plurality of synthesized images into a predetermined format,
wherein the transmission unit transmits the information converted into the predetermined format by the conversion unit to the external device.

13. The image processing apparatus according to claim 12, wherein the conversion unit compresses the plurality of synthesized images, which are formed by the image synthesizing unit, based on compression system corresponding to each of the synthesized images.

14. An image processing apparatus comprising:

a reception unit for receiving information from an external device, the information having a predetermined format and including a plurality of images, attribute information of the images, and synthesis instruction information indicating to place the plurality of images side by side to synthesize the plurality of images to form a single image;

an extraction unit for extracting the plurality of images and the attribute information of the images from the information having the predetermined format;

a correction unit for correcting the plurality of images extracted by the extraction unit based on the attribute information extracted by the extraction unit;

a reduction unit for reducing the plurality of images corrected by the correction unit;

a synthesizing unit for placing the plurality of images reduced by the reduction unit side by side to synthesize the plurality of reduced images to form a single image; and an output unit for outputting the single synthesized image, wherein the reduction unit reduces the plurality of corrected images based on the synthesis instruction information contained in the information having the predetermined format; and wherein the synthesizing unit executes the synthesis based on the synthesis instruction information contained in the information having the predetermined format.

15. An image processing apparatus comprising:

a reception unit for receiving information from an external device, the information having a predetermined format and including a plurality of images, attribute information of the images, and synthesis instruction information indicating to place the plurality of images side by side to synthesize the plurality of images to form a single image;

an extraction unit for extracting the plurality of images and the attribute information of the images from the information having the predetermined format;

a reduction unit for reducing the plurality of images corrected by the correction unit;

a correction unit for correcting the plurality of images reduced by the reduction unit based on the attribute information extracted by the extraction unit;

a synthesizing unit for placing the plurality of images corrected by the correction unit side by side to synthesize the plurality of corrected images to form a single image when judging to synthesize the plurality of images to form a single image based on the synthesis instruction information contained in the information having the predetermined format; and an output unit for outputting the single synthesized image, wherein the reduction unit reduces the plurality of corrected images based on the synthesis instruction information contained in the information having the predetermined format; and wherein the synthesizing unit executes the synthesis based on the synthesis instruction information contained in the information having the predetermined format.

16. An image processing apparatus comprising:

a reception unit for receiving information from an external device, the information having a predetermined format and including a plurality of images, attribute information of the images, and synthesis instruction information indicating to place the plurality of images side by side to synthesize the plurality of images to form a single image;

an extraction unit for extracting the plurality of images and the attribute information of the images from the information having the predetermined format;

a reduction unit for reducing the plurality of images extracted by the extracting unit;

a synthesizing unit for placing the plurality of images reduced by the reduction unit side by side to synthesize the plurality of reduced images to form a single image;

a correction unit for correcting the single synthesized image based on the attribute information of the plurality of images extracted by the extraction unit;

an output unit for outputting the single synthesized image corrected by the correction unit, wherein the reduction unit reduces the plurality of corrected images based on the synthesis instruction information contained in the information having the predetermined format; and wherein the synthesizing unit executes the synthesis based on the synthesis instruction information contained in the information having the predetermined format.

17. An image processing apparatus comprising:

a reduction unit for reducing a plurality of input images;

a conversion unit for converting the plurality of images reduced by the reduction unit and synthesis instruction information into information having a predetermined format, the synthesis instruction information indicating to place the plurality of reduced images and the plurality of images side by side to form a single image for N-up printing; and a transmission unit for transmitting the information having the predetermined format converted by the conversion unit to an external device.

18. The image processing apparatus according to claim 17, wherein the conversion unit converts the plurality of reduced images, the synthesis instruction information, and attribute information of the plurality of images into the information having a predetermined format.

19. An image processing apparatus comprising:

a reception unit for receiving information from an external device, the information having a predetermined format and including a plurality of images, attribute information of the images, and synthesis instruction information indicating to place the plurality of images side by side to synthesize the plurality of images to form a single image;

an extraction unit for extracting the plurality of images and the attribute information of the images from the information having the predetermined format;

a correction unit for correcting the plurality of images extracted by the extraction unit based on the attribute information extracted by the extraction unit;

a synthesizing unit for placing the plurality of images corrected by the correction unit side by side to synthesize the plurality of corrected images to form a single image when judging to synthesize the plurality of images to form a single image based on the synthesis instruction information contained in the information having the predetermined format; and an output unit for outputting the single synthesized image.

20. An image processing apparatus comprising:

a reception unit for receiving information from an external device, the information having a predetermined format and including a plurality of images, attribute information of the images, and synthesis instruction information indicating to place the plurality of images side by side to synthesize the plurality of images to form a single image;

an extraction unit for extracting the plurality of images and the attribute information of the images from the information having the predetermined format;

a synthesizing unit for placing the plurality of images extracted by the extraction unit side by side to synthesize the plurality of corrected images to form a single image when judging to synthesize the plurality of images to form a single image based on the synthesis instruction information contained in the information having the predetermined format;

a correction unit for correcting the single synthesized image based on the attribute information extracted by the extraction unit; and an output unit for outputting the single synthesized image.

21. An image processing method comprising the steps of:
reducing a plurality of input images;
synthesizing the plurality of reduced image by placing the plurality of reduced images side by side, to form a single synthesized image for N-up printing;
generating attribute information corresponding to the single synthesized image; and
transmitting the single synthesized image and the attribute information to an external device.

22. The image processing method according to claim 21, wherein in the generation step, the attribute information is generated every region in which the image reduced before being synthesized is employed as a minimum unit.

23. The image processing method according to claim 21, wherein in the generating step, the single attribute information corresponding to the synthesized image. is generated from attribute information pieces of the plurality of images to be synthesized.

24. The image processing method according to claim 21, wherein in the generating step, the attribute information corresponding to the synthesized image is generated in the unit of a pixel of the synthesized image.

25. An image processing method comprising the steps of:
receiving information from an external device, the information including a single synthesized image synthesized by placing a plurality of images side by side and attribute information corresponding to the synthesized image;
extracting the synthesized image and the attribute information from the received information;
generating another attribute information for every an area different from an area corresponding to the attribute information, based on the extracted attribute information; and
correcting the synthesized image based on the generated another attribute information.

26. An image processing method comprising the steps of:
reducing a plurality of input images;
synthesizing the plurality of reduced image by placing the plurality of reduced images side by side, to form a single synthesized image for N-up printing every attribution information of the image;
transmitting the plurality of synthesized images to an external device.

27. The image processing method according to claim 26, wherein after the plurality of synthesized images have been compressed based on compression systems corresponding to each of synthesized images, the reduced synthesized images are transmitted to the external device.

28. An image processing method comprising the steps of:
receiving information having a predetermined format from an external device, the information including a plurality of images, attribute information of the images, and synthesis instruction information indicating to place the plurality of images side by side to synthesize the plurality of images to form a single synthesized image;
extracting the plurality of images and the attribute information of the images from the information having the predetermined format;
correcting the plurality of extracted images based on the extracted attribute information;
reducing the plurality of corrected images based on the synthesis instruction information;
synthesizing the plurality of reduced image by placing the plurality of reduced images side by side, to form a single synthesized image; and
outputting the synthesized image.

29. An image processing method comprising the steps of:
receiving information having a predetermined format from an external device, the information including a plurality of images, attribute information of the images, and synthesis instruction information indicating to place the plurality of images side by side to synthesize the plurality of images to form a single synthesized image;
extracting the plurality of images and the attribute information of the images from the information having the predetermined format;
reducing the plurality of extracted images based on the synthesize instruction information;
correcting the plurality of extracted images based on the extracted attribute information;
synthesizing the plurality of corrected images by placing the plurality of corrected images side by side based on the synthesizing instruction information to form a single synthesized image; and
outputting the synthesized image.

30. An image processing method comprising the steps of:
receiving information having a predetermined format from an external device, the information including a plurality of images, attribute information of the images, and synthesis instruction information indicating to place the plurality of images side by side to synthesize the plurality of images to form a single synthesized image;
extracting the plurality of images and the attribute information of the images from the information having the predetermined format;
reducing the plurality of extracted images based on the synthesize instruction information;
synthesizing the plurality of extracted images by placing the plurality of extracted images side by side based on the synthesis instruction information to form a single synthesized image;
correcting the synthesized image based on the attribute information of each of extracted images; and
outputting the corrected synthesized image.

31. An image processing method comprising the steps of:
receiving information having a predetermined format from an external device, the information including a plurality of images, attribute information of the images, and synthesis instruction information indicating to place the plurality of images side by side to synthesize the plurality of images to form a single synthesized image;
extracting the plurality of images and the attribute information of the images from the information having the predetermined format;

correcting the plurality of extracted images based on the extracted attribute information;

synthesizing the plurality of corrected images by placing the plurality of corrected images side by side based on the synthesis instruction information to form a single synthesized image;

outputting the synthesized image.

32. An image processing method comprising the steps of:

receiving information having a predetermined format from an external device, the information including a plurality of images, attribute information of the images, and synthesis instruction information indicating to place the plurality of images side by side to synthesize the plurality of images to form a single synthesized image;

extracting the plurality of images and the attribute information of the images from the information having the predetermined format;

synthesizing the plurality of extracted images by placing the plurality of extracted images side by side based on the synthesis instruction information to form a single synthesized image;

correcting the synthesized image based on the extracted attribute information of the plurality of images; and outputting the corrected synthesized image.

33. A computer readable storage medium storing a program for causing a computer to execute an image processing method comprising the steps of:

reducing a plurality of input images;

synthesizing the plurality of reduced image by placing the plurality of reduced images side by side, to form a single synthesized image for N-up printing;

generating attribute information corresponding to the single synthesized image; and transmitting the single synthesized image and the attribute information to an external device.

* * * * *